US008669760B2

(12) United States Patent
Kikuchi et al.

(10) Patent No.: US 8,669,760 B2
(45) Date of Patent: Mar. 11, 2014

(54) ANGLE DETECTION SYSTEM AND METHOD OF MANUFACTURING THE SAME

(75) Inventors: Yoshimi Kikuchi, Nagano (JP); Masahito Okada, Nagano (JP); Minow Okada, legal representative, Shichinohe-machi (JP); Kanji Kitazawa, Nagano (JP); Hisashi Mimura, Nagano (JP)

(73) Assignee: Tamagawa Seiki Co., Ltd., Nagano (JP)

( * ) Notice: Subject to any disclaimer, the term of this patent is extended or adjusted under 35 U.S.C. 154(b) by 377 days.

(21) Appl. No.: 12/992,676

(22) PCT Filed: May 9, 2009

(86) PCT No.: PCT/JP2009/058717
§ 371 (c)(1),
(2), (4) Date: Jan. 30, 2011

(87) PCT Pub. No.: WO2009/139338
PCT Pub. Date: Nov. 19, 2009

(65) Prior Publication Data
US 2011/0285386 A1    Nov. 24, 2011

(30) Foreign Application Priority Data
May 15, 2008    (JP) .................................. 2008-128879

(51) Int. Cl.
*H02K 15/02*    (2006.01)
(52) U.S. Cl.
USPC ............... 324/207.25; 324/207.17; 310/68 B; 29/598; 29/605
(58) Field of Classification Search
None
See application file for complete search history.

(56) References Cited

U.S. PATENT DOCUMENTS 5,446,966 A * 9/1995 Ishizaki ........................ 33/1 PT
6,137,204 A * 10/2000 Kuwahara ............... 310/216.112
(Continued)

FOREIGN PATENT DOCUMENTS

| EP | 1918681 A1 | 5/2008 |
|---|---|---|
| JP | 5176507 A | 7/1993 |

(Continued)

OTHER PUBLICATIONS

Machine English translation of Japanese Patent Application Publication to Inventor Kitazawa Kanji. JP 2001-352734 A, Dec. 21, 20012. Translation of pp. 2-5 created on Apr. 4, 2013.*

(Continued)

*Primary Examiner* — Melissa Koval
*Assistant Examiner* — Stephen G Armstrong
(74) *Attorney, Agent, or Firm* — Lowe Hauptman & Ham, LLP

(57)    ABSTRACT

An angle detection system of the present invention includes: a stator 200 which includes a plurality of salient pole portions which are formed on a flat sheet made of a magnetic material and are raised by bending, each salient pole portion constituting a winding magnetic core on which a winding member for excitation and a winding member for detection are mounted; and a rotor 300 which is made of a magnetic material and is configured to be rotatable relative to the stator such that gap permeance between the rotor and each salient pole portion is changed due to the rotation thereof about a rotational axis thereof. According to the angle detection device of the present invention, it is possible to provide the angle detection device which can largely reduce the number of parts and can realize the reduction of cost and the enhancement of reliability.

20 Claims, 15 Drawing Sheets

(56) References Cited

U.S. PATENT DOCUMENTS

2007/0182268 A1* 8/2007 Hashiba et al. ............... 310/217
2009/0289622 A1  11/2009 Kikuchi et al.

FOREIGN PATENT DOCUMENTS

| | | |
|---|---|---|
| JP | 08-033299 A | 2/1996 |
| JP | 09-051640 A | 2/1997 |
| JP | 2000-292119 A | 10/2000 |
| JP | 2000-292120 A | 10/2000 |
| JP | 2001-352734 A | 12/2001 |
| JP | 2004-205345 A | 7/2004 |

OTHER PUBLICATIONS

Extended European Search Report dated Oct. 28, 2013, corresponds to European patent application No. 09746545.4.

* cited by examiner

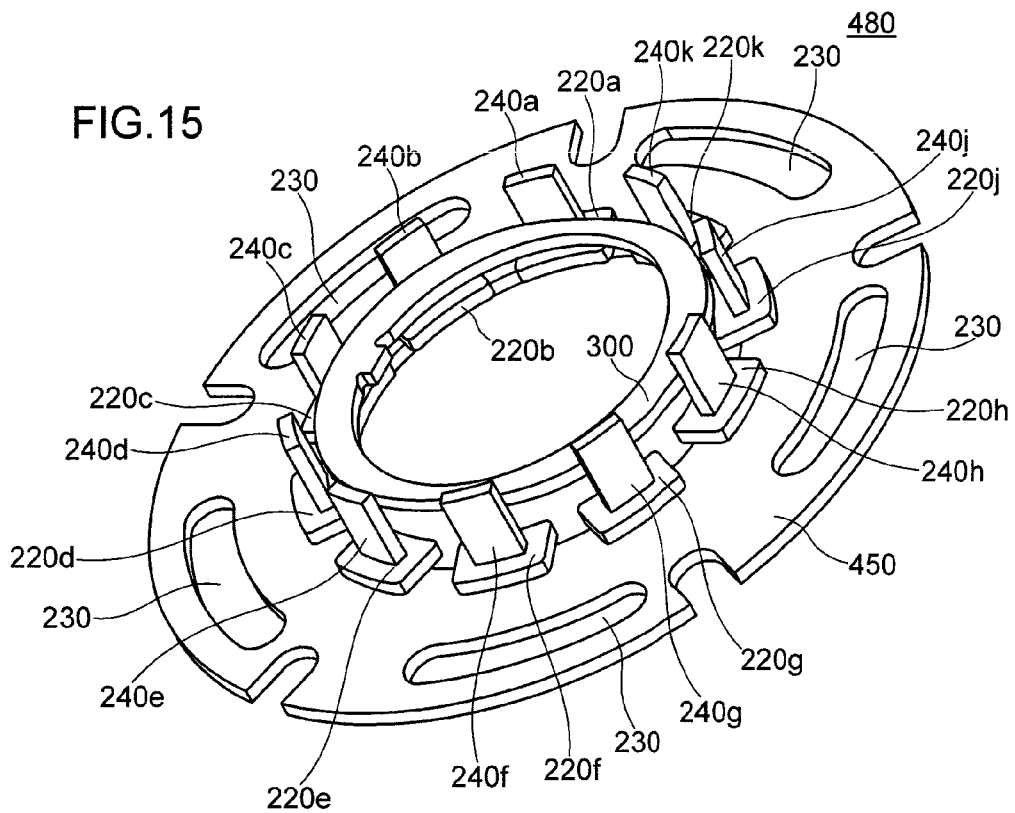
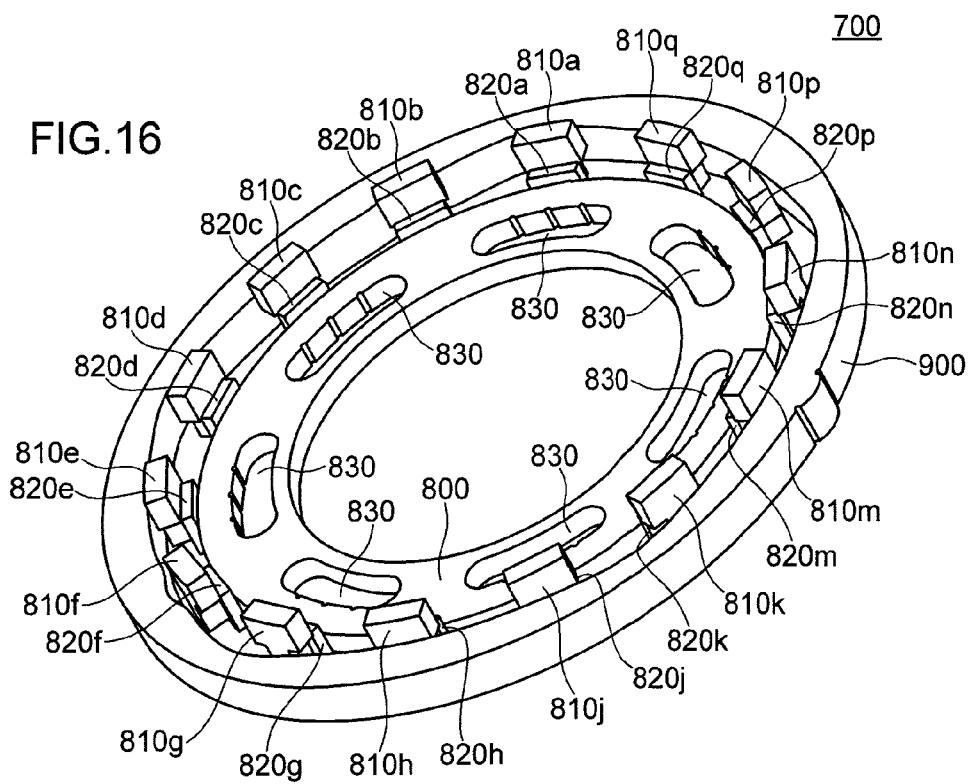

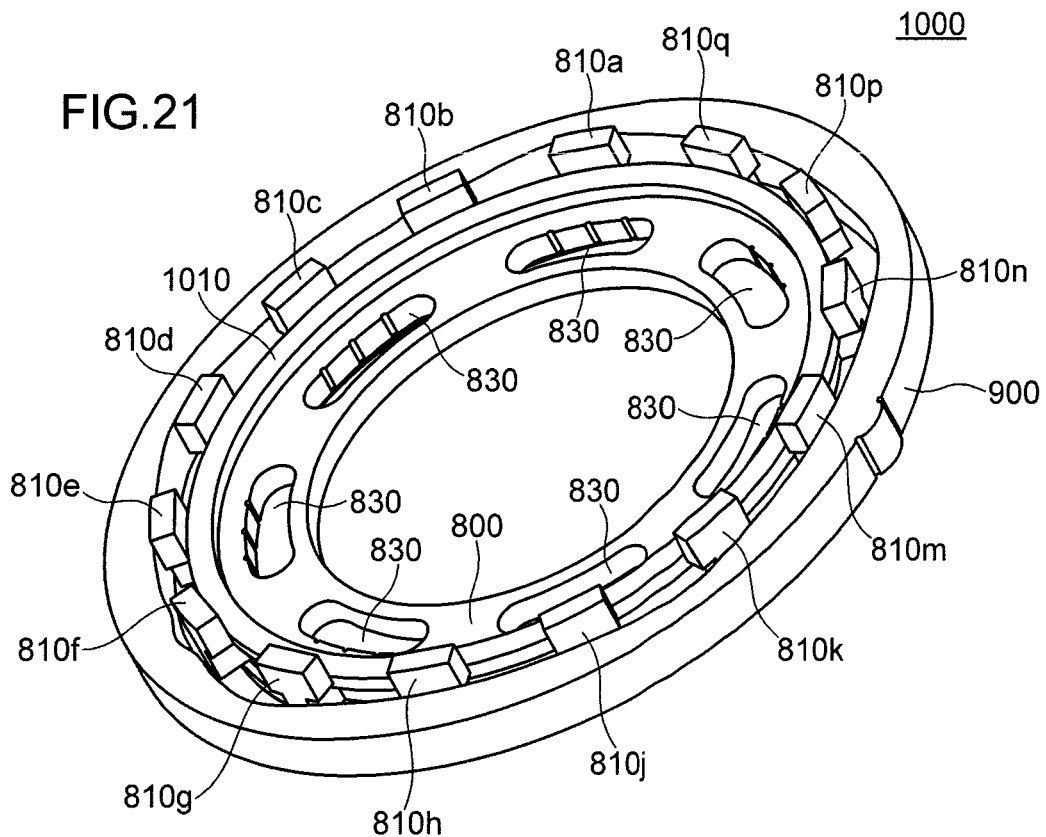
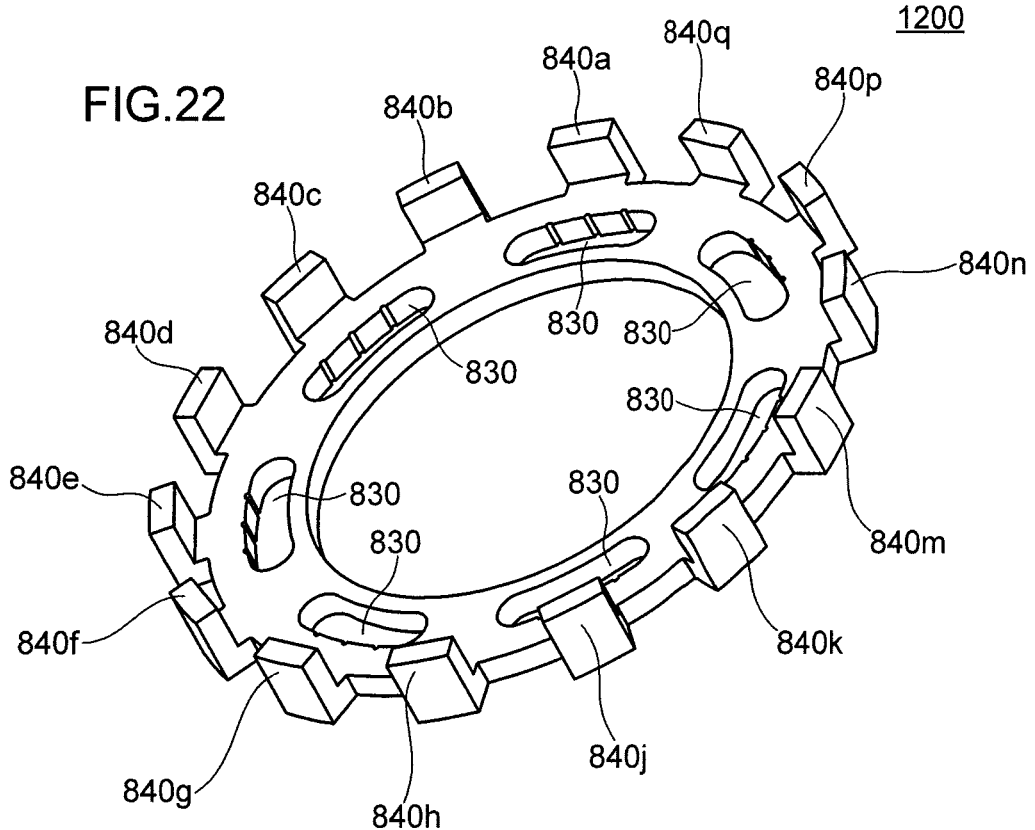

ANGLE DETECTION SYSTEM AND METHOD OF MANUFACTURING THE SAME

RELATED APPLICATIONS

The present application is national phase of PCT/JP2009/058717 filed May 9, 2009, and claims priority from Japanese Application Number 2008-128879 filed May 15, 2008.

TECHNICAL FIELD

The present invention relates to an angle detection system and a method of manufacturing the same.

BACKGROUND ART

Conventionally, this type of resolver includes a stator and a rotor, and outputs an output signal corresponding to a rotational angle of the rotor relative to the stator by making use of a phenomenon that mutual inductance between the stator and the rotor changes corresponding to the rotational position of the rotor relative to the stator.

FIG. 24 is a view for explaining a conventional resolver. FIG. 24(a) is a view showing the structure of the conventional resolver, and FIG. 24(b) is a view for explaining the winding structure of each slot of the conventional resolver.

The conventional resolver 10 is, as shown in FIG. 24(a), a variable-reluctance resolver which includes a stator 11 in which excitation winding 14 of one phase and detection windings of two phases (SIN detection winding 16 and COS detection winding 17 (not shown in FIG. 24(a))) are wound around salient-pole portions 13, and a rotor 15 which is arranged rotatably relative to the stator 11. The rotor 15 is an eccentric rotor which is formed of only an iron core and has no winding, and gap permeance between the rotor 15 and the stator 11 changes in a sinusoidal manner with respect to a rotational angle θ. Therefore, according to the conventional resolver 10, as shown in FIG. 24(b), it is possible to detect the rotational angle with high accuracy by measuring the above-mentioned gap permeance.

Further, in the conventional resolver 10, detection windings of two phases (SIN detection winding 16 and COS detection winding 17 are wound around in respective slots 12 at one slot pitch (a state where the winding is continuously inserted into each slot without slot leap) (not shown in FIG. 24(a)). Also as shown in FIG. 24(b), the detection windings are wound such that the distribution of a voltage induced in each detection winding becomes the sinusoidal distribution (the distribution of number of turns (quantity) of each winding also becoming the sinusoidal distribution).

Due to such a constitution, the conventional resolver 10 can reduce high frequency components ranging from lower-order frequency components to higher-order frequency components contained in an output voltage thus enhancing the detection accuracy of a rotational angle.

However, the conventional resolver 10 has the structure shown in FIG. 24(a) and hence, it is difficult to wind the excitation windings and the detection windings around the salient poles so that the structure of an automatic winding machine becomes complicated, for example. In view of such circumstances, for example, patent document 1 and patent document 2 disclose an angle detection system which can form salient poles and a rotor using a metal sheet or the like while providing excitation winding and detection winding to a bobbin arranged on a stator side or printing excitation winding and detection winding to a multi-layered printed circuit board on a stator side.

PRIOR ART LITERATURE

Patent Document

Patent document 1: JP-A-2000-292119
Patent document 2: JP-A-2000-292120

DISCLOSURE OF INVENTION

Problem that the Invention is to Solve

However, the angle detection system disclosed in patent document 1 and patent document 2 has a drawback that the number of parts is large so that it is difficult to achieve the reduction of a manufacturing cost of the angle detection system and the enhancement of reliability of the angle detection system. Further, the angle detection system disclosed in patent document 1 and patent document 2 also has a drawback that yokes of a stator are formed by cutting and raising or the like so that undesired projections are formed on an inner side of a stator whereby the magnetic efficiency between the stators cannot be enhanced whereby the further enhancement of the detection accuracy is difficult.

The present invention has been made in view of such technical drawbacks, and it is an object of the present invention to provide an angle detection system and a method of manufacturing the angle detection system which can achieve the further enhancement of detection accuracy while achieving the reduction of cost and the enhancement of reliability by reducing the number of parts.

Means for Solving the Problem

To overcome the above-mentioned drawbacks, the present invention is directed to an angle detection system which includes: a stator which includes a plurality of salient pole portions which are formed on a flat sheet made of a magnetic material and are raised by bending, each salient pole portion constituting a winding magnetic core on which a winding member for excitation and a winding member for detection are mounted; and a rotor which is made of a magnetic material and is configured to be rotatable relative to the stator such that gap permeance between the rotor and each salient pole portion is changed due to the rotation thereof about a rotational axis thereof.

According to the present invention, the plurality of salient pole portions are raised by bending the stator having the plurality of salient pole portions formed on the flat sheet, and the rotor is provided in a rotatable manner relative to the stator such that the gap permeance between the rotor and each salient pole portion is changed due to the rotation of the rotor about the rotational axis. Accordingly, it is possible to provide the angle detection system which can largely reduce the number of parts and can achieve the reduction of cost and the enhancement of reliability without lowering the detection accuracy.

Further, according to the angle detection system of the present invention, the angle detection system may be an inner-rotor-type angle detection system in which gap permeance between an outer side of the rotor and each salient pole portion is changed due to the rotation of the rotor.

According to the present invention, it is possible to provide the inner-rotor-type angle detection system which can largely reduce the number of parts and can achieve the reduction of cost and the enhancement of reliability.

Further, according to the angle detection system of the present invention, a smallest inner diameter of the stator after bending may be an inner diameter of the stator at the respective salient pole portions.

According the present invention, in the inner-rotor-type angle detection system, by forming the salient pole portions such that undesired projections are not formed on an inner side of the stator, the magnetic efficiency is enhanced by a magnetic circuit by way of the salient pole portions so that a transformation ratio of the angle detection system can be increased.

Further, according to the angle detection system of the present invention, the angle detection system may be an outer-rotor-type angle detection system in which gap permeance between an inner side of the rotor and each salient pole portion is changed due to the rotation of the rotor.

According to the present invention, it is possible to provide the outer-rotor-type angle detection system which can largely reduce the number of parts and can achieve the reduction of cost and the enhancement of reliability.

Further, according to the angle detection system of the present invention, a largest outer diameter of the stator after bending may be an outer diameter of the stator at the respective salient pole portions.

According to the present invention, in the outer-rotor-type angle detection system, by forming the salient pole portions such that undesired projections are not formed on an outer diameter side of the stator, the magnetic efficiency is enhanced by a magnetic circuit by way of the salient pole portions so that a transformation ratio of the angle detection system can be increased.

Further, according to the angle detection system of the present invention, a distal end shape of each salient pole portion may have a T shape, and the winding member for excitation and the winding member for detection may be mounted on a periphery of a support portion which supports a distal end portion of each salient pole portion.

According to the present invention, by forming the distal end shape of the salient pole portion on which the winding member is mounted into a T shape, it is possible to reduce a change of magnetic efficiency with respect to the deviation of the rotor in the axial direction. Accordingly, the influence of a change of a magnetic flux in the vicinity of the winding member can be reduced so that the detection accuracy of a rotational angle of the rotor relative to the stator can be enhanced. Further, by adopting the T shape as the shape of the distal end of the salient pole portion, even when the number of salient pole portions is increased, the reduction of a magnetic flux which passes the winding magnetic core can be suppressed whereby the lowering of detection accuracy can be suppressed.

Further, according to the angle detection system of the present invention, a material of the stator may be SPCC which is common steel or S45C which is carbon steel for machine structural use.

According to the present invention, by adopting SPCC or S45C with which bending forming accuracy and reliability can be easily maintained as a material of the stator, the stator can be provided using an inexpensive material thus providing the highly reliable angle detection system at a low cost.

Further, according to the angle detection system of the present invention, the angle detection system may include a converter which outputs a digitized signal corresponding to an output signal from the winding member corresponding to a rotational angle of the rotor relative to the stator.

According to the present invention, it is possible to provide the angle detection system which can achieve the reduction of cost and the enhancement of reliability and also can further enhance the detection accuracy thus outputting a digitized signal corresponding to a rotational angle of the rotor.

Further, the present invention is directed to a method of manufacturing an angle detection system which includes: a bending step in which a plurality of salient pole portions of a stator which is formed on a flat sheet made of a magnetic material are bent such that the salient pole portion are raised from a surface of the flat sheet; a winding member mounting step in which, using each salient pole portion of the plurality of salient pole portions as a winding magnetic core, the winding member for excitation and the winding member for detection are wound around each salient pole portion; and a rotor mounting step in which a rotor which is made of a magnetic material and is configured to be rotatable relative to the stator such that gap permeance between the rotor and each salient pole portion is changed due to the rotation thereof about a rotational axis thereof is mounted on the stator.

Further, according to the method of manufacturing an angle detection system of the present invention, in the rotor mounting step, the rotor may be mounted such that gap permeance between an outer side of the rotor and each salient pole portion is changed due to the rotation of the rotor.

Further, according to the method of manufacturing an angle detection system of the present invention, in the bending step, the bending may be performed such that a smallest inner diameter of the stator after bending is an inner diameter of the stator at the respective salient pole portions.

Further, according to the method of manufacturing an angle detection system of the present invention, in the rotor mounting step, the rotor may be mounted such that gap permeance between an inner side of the rotor and each salient pole portion is changed due to the rotation of the rotor.

Further, according to the method of manufacturing an angle detection system of the present invention, in the bending step, a largest outer diameter of the stator after bending may be an outer diameter of the stator at the respective salient pole portions.

Further, according to the method of manufacturing an angle detection system of the present invention, a distal end shape of each salient pole portion of the stator may have a T shape, and the winding member for excitation and the winding member for detection may be mounted on a periphery of a support portion which supports a distal end portion of each salient pole portion.

Further, according to the method of manufacturing an angle detection system of the present invention, a material of the stator may be SPCC which is common steel or S45C which is carbon steel for machine structural use.

BRIEF EXPLANATION OF DRAWINGS

FIG. 15 is a perspective view of a constitutional example of a resolver according to the second modification of the embodiment 1.

FIG. 16 is a perspective view of a constitutional example of a resolver according to an embodiment 2 of the present invention.

FIG. 21 is a perspective view of a constitutional example of a resolver according to a first modification of the embodiment 2.

FIG. 22 is a perspective view of a constitutional example of a stator according to a second modification of the embodiment 2.

MODE FOR CARRYING OUT THE INVENTION

Hereinafter, embodiments of the present invention are explained in detail in conjunction with drawings. Here, the embodiments explained hereinafter are not intended to unduly limit contents of the present invention described in Claims. Further, all constitutions explained hereinafter do not always constitute indispensable constitutional elements of the present invention.

Although the explanation is made hereinafter by taking a resolver as an example of the angle detection system according to the present invention, the present invention is not limited to the resolver.

Embodiment 1

Figure 1:
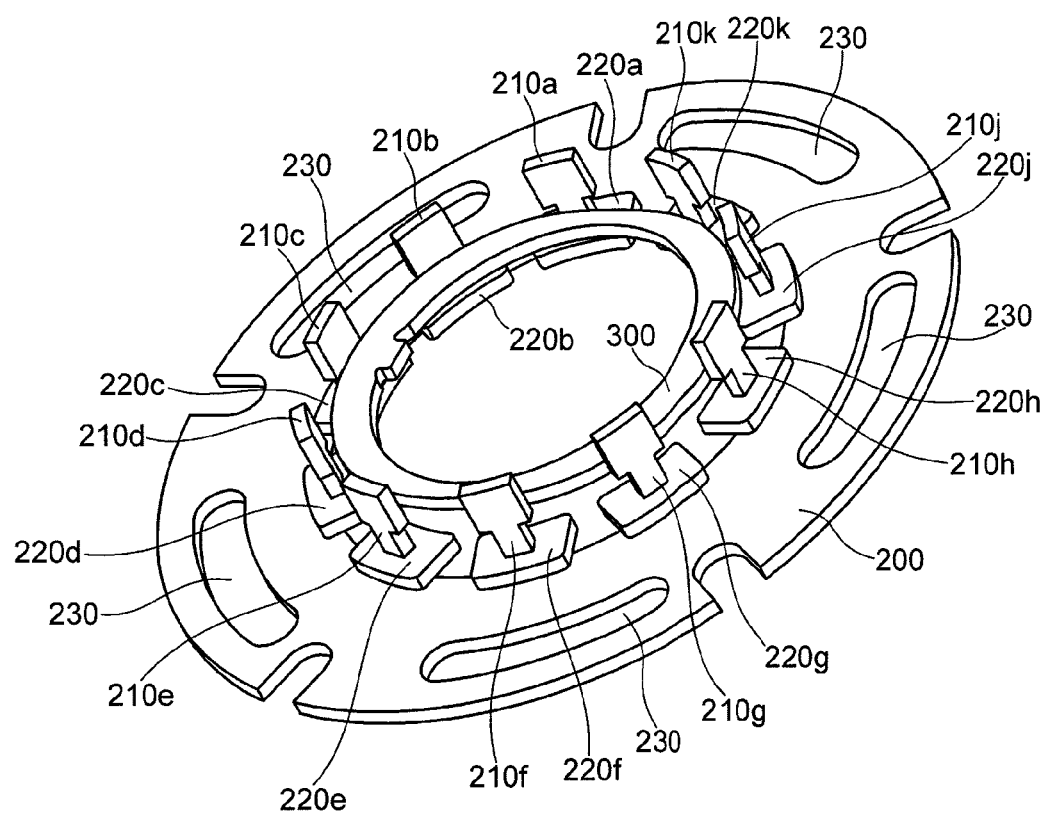
FIG. 1 is a perspective view of a constitutional example of a resolver according to an embodiment 1 of the present invention.

FIG. 1 is a perspective view of a constitutional example of a resolver according to an embodiment 1 of the present invention. In FIG. 1, the illustration of wiring is omitted. Although the explanation is made, in FIG. 1, by taking a 1-phase excitation and 2-phase detection type resolver which has ten salient pole portions as an example, the present invention is not limited to such a resolver.

A resolver 100 in the embodiment 1 is a so-called inner-rotor type angle detection system. That is, a rotor is arranged inside a stator, and a signal from detection winding mounted on the stator is changed corresponding to a rotational angle of the rotor.

The resolver 100 of the embodiment 1 includes the stator (stationary part) 200 and a rotor (rotary part) 300. The stator 200 includes, on an annular (ring-shaped) flat sheet made of a magnetic material, ten salient pole portions 210a, 210b, 210c, 210d, 210e, 210f, 210g, 210h, 210j, 210k which are formed on an annular (ring-shaped) flat sheet made of a magnetic material by raising from a surface of the flat sheet. These salient pole portions are formed on a brim portion on an inner side (inner diameter side) of an annular flat sheet. Out of surfaces of each salient pole portion, at least a surface which faces the rotor 300 in an opposed manner is not a flat surface, and is formed so as to constitute a portion of a circle which has the center inside the annular flat sheet as viewed in the direction along the rotary shaft of the rotor 300.

Further, a winding member for excitation and a winding member for detection are mounted on each salient pole portion which works as a winding magnetic core. That is, the winding members 220a for excitation and detection are mounted on the salient pole portion 210a which works as the winding magnetic core. The winding members 220b for excitation and detection are mounted on the salient pole portion 210b which works as the winding magnetic core. The winding members 220c for excitation and detection are mounted on the salient pole portion 210c which works as the winding magnetic core. The winding members 220d for excitation and detection are mounted on the salient pole portion 210d which works as the winding magnetic core. The winding members 220e for excitation and detection are mounted on the salient pole portion 210e which works as the winding magnetic core. In the same manner, the winding members 220f for excitation and detection are mounted on the salient pole portion 210f which works as the winding magnetic core. The winding members 220g for excitation and detection are mounted on the salient pole portion 210g which works as the winding magnetic core. The winding members 220h for excitation and detection are mounted on the salient pole portion 210h which works as the winding magnetic core. The winding members 220j for excitation and detection are mounted on the salient pole portion 210j which works as the winding magnetic core. The winding members 220k for excitation and detection are mounted on the salient pole portion 210k which works as the winding magnetic core.

The salient pole portions 210a to 210k which the stator 200 includes are formed on a flat sheet in advance and, thereafter, are raised by bending press forming (broadly bending) such that the salient pole portions 210a to 210k become substantially perpendicular to a surface of the flat sheet.

Further, a plurality of mounting holes 230 (5 holes in FIG. 1) which are elongated in the circumferential direction than in the radial direction are formed in the stator 200. Fixing members not shown in the drawing are made to pass through these mounting holes 230 and fix the stator 200 to a fixing plate for fixing the resolver 100. By forming the mounting holes 230 in such a manner that the mounting holes 230 are elongated in the circumferential direction of the stator 200, it is possible to easily perform the fine adjustment of a fixing position of the resolver 100 with respect to the rotational direction of the rotor 300.

The rotor 300 is made of a magnetic material and is provided in a rotatable manner relative to the stator 200. To be more specific, the rotor 300 is provided in a rotatable manner relative to the stator 200 such that gap permeance between the rotor 300 and each salient pole portion of the stator 200 is changed due to the rotation of the rotor 300 about a rotational axis thereof.

Here, a winding member for taking out a detection signal outputted from the detection winding due to the rotation of the rotor 300 is explained.

Figure 2A:
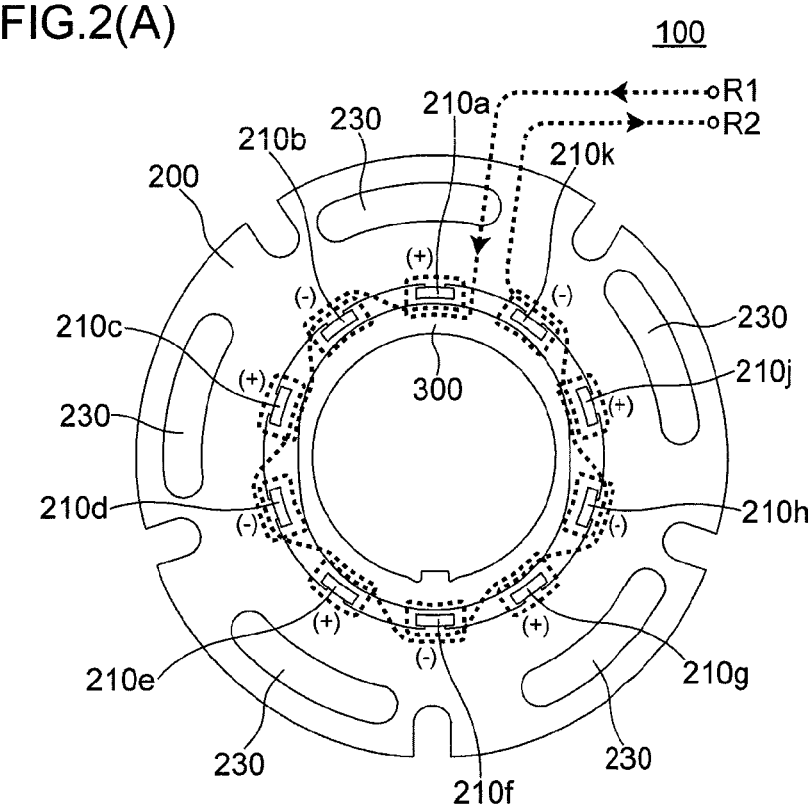
FIG. 2(a) is an explanatory view of a winding member for excitation which is mounted on salient pole portions of the embodiment 1 and FIG. 2(b) is an explanatory view of a winding member for detection which is mounted on salient pole portions of the embodiment 1.
Figure 2B:
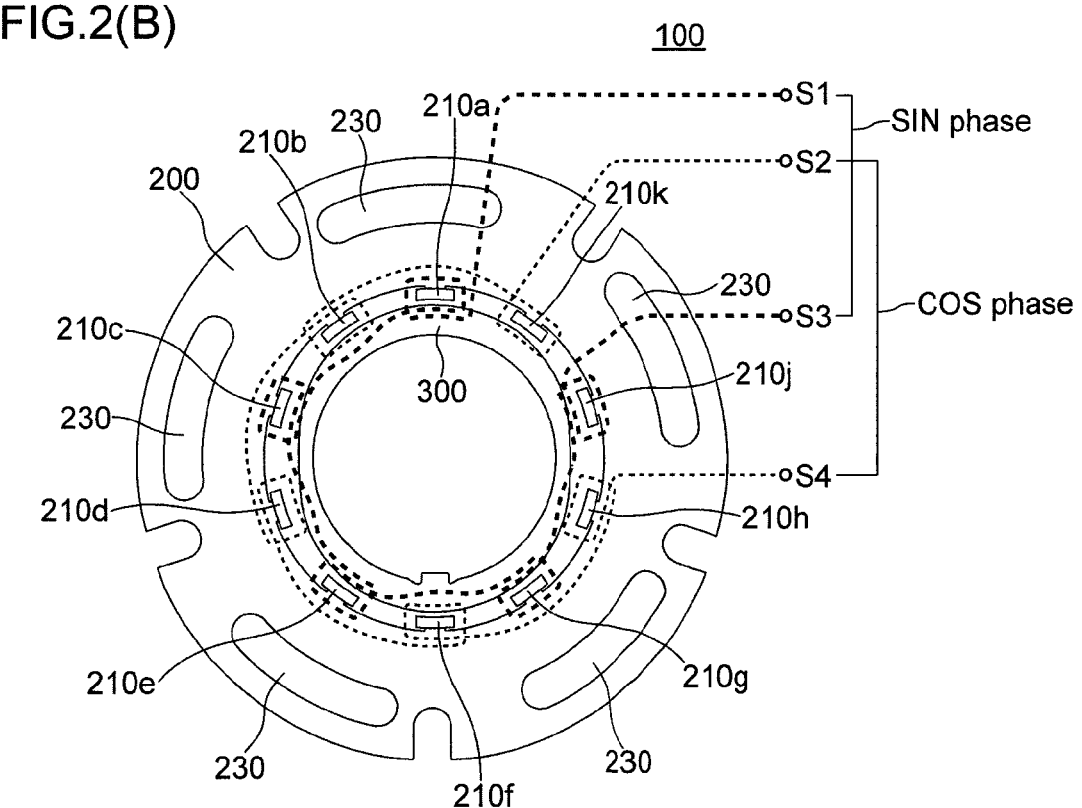

FIG. 2(a) and FIG. 2(b) are explanatory views of winding members mounted on the salient pole portions of the stator 200, wherein FIG. 2(a) is the explanatory view of a winding member for excitation, and FIG. 2(b) is the explanatory view of a winding member for detection. FIG. 2(a) and FIG. 2(b) are plan views when the resolver 10 is viewed in the rotational axis direction of the rotor 300 in FIG. 1. In the drawings, parts identical with the parts shown in FIG. 1 are given the same symbols and the explanation of these parts is omitted when appropriate. In FIG. 2(a), the winding direction of the excitation winding which constitutes the winding member for excitation is schematically indicated by a broken line, while in FIG. 2(b), the winding direction of the detection winding which constitutes the winding member for detection is schematically indicated by a broken line.

As shown in FIG. 2(a), the winding member for excitation is provided such that the winding directions of the winding member mounted on the salient pole portions arranged adjacent to each other become opposite to each other. The winding member for excitation mounted on each salient pole portion may be formed of a coil winding, for example. An excitation signal is applied between terminals R1, R2 of the winding which constitutes such winding member for excitation.

Further, as shown in FIG. 2(b), to obtain detection signals of two phases, the winding member for detection is constituted of two sets of winding members. The winding member for detection for obtaining a detection signal of a first phase (for example, SIN phase) of the detection signals of two phases is wound around the respective salient pole portions for every one other in the counter clockwise direction from the salient pole portion 210a to the salient pole portion 210j, for example. On the other hand, the winding member for detection for obtaining a detection signal of a second phase (for example, COS phase) of the detection signals of two phases is wound around the respective salient pole portions for every one other in the counter clockwise direction from the salient pole portion 210k to the salient pole portion 210n, for example. The detection signal of the first phase is detected as a signal generated between winding terminals S1, S3, and the detection signal of the second phase is detected as a signal generated between winding terminals S2, S4. The winding member for detection which is mounted on each salient pole portion may be formed of a coil winding, for example.

In the embodiment 1, the winding direction of the winding member for excitation is not limited to the direction shown in FIG. 2(a). Further, in the embodiment 1, the winding direction of the winding member for detection is not limited to the direction shown in FIG. 2(b).

In the resolver 100 having such a constitution, a following magnetic circuit is formed due to the rotation of the rotor 300 relative to the stator 200.

Figure 3:
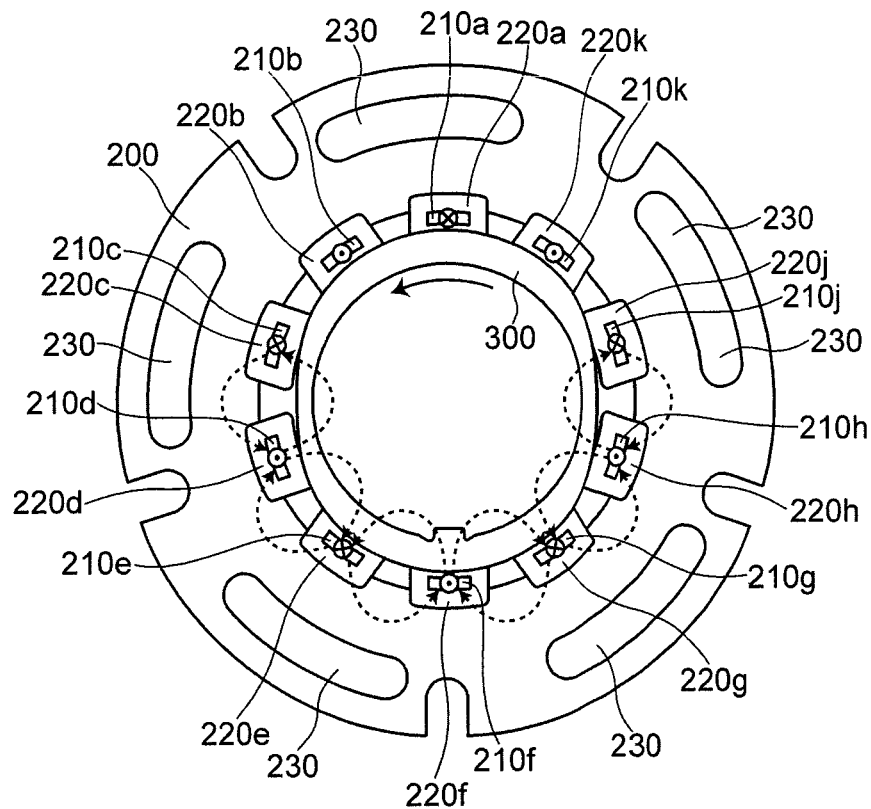
FIG. 3 is a top plan view of the resolver shown in FIG. 1.

FIG. 3 is a top plan view of the resolver 100 shown in FIG. 1. FIG. 3 is a plan view of the resolver 100 as viewed in the rotational axis direction of the rotor 300 shown in FIG. 1. Parts identical with the parts shown in FIG. 1 or FIG. 2 are given same symbols and their explanation is omitted when appropriate.

FIG. 3 schematically shows the direction of a magnetic flux at a point of time where the rotor 300 is in a rotation state relative to the stator 200. FIG. 3 schematically shows the direction of the magnetic flux which passes through the respective salient pole portions which constitute the winding magnetic core, wherein the direction of the magnetic flux among the salient pole portions is indicated by a broken line.

The winding member is mounted on each salient pole portion of the stator 200. When the rotor 300 is rotated, a magnetic circuit is formed between the neighboring salient pole portions by way of the rotor 300. In the embodiment 1, as shown in FIG. 3, the winding member is mounted on the respective salient pole portions such that the directions of the magnetic fluxes which pass through the neighboring salient pole portions become opposite to each other. As a result, due to the rotation of the rotor 300, corresponding to a change of gap permeance between the rotor 300 and each salient pole portion, an electric current which is generated in the winding member wound around each salient pole portion is also changed. For example, it is possible to allow an electric current generated in the winding member to take a sinusoidal wave form.

In the resolver 100 having the above-mentioned constitution, it is desirable that a material of the stator 200 made of a magnetic material is SPCC (one steel plate) which is common steel or S45C which is carbon steel for machine structural use (one steel plate) rather than a laminated rolled magnetic steel plate. SPCC (Steel Plate Cold Commercial) is a cold rolled steel plate or strip defined by JIS G3141. S45C is a carbon steel material for machine structural use stipulated in JIS G 4051 and contains approximately 0.45% of carbon.

Figure 4:
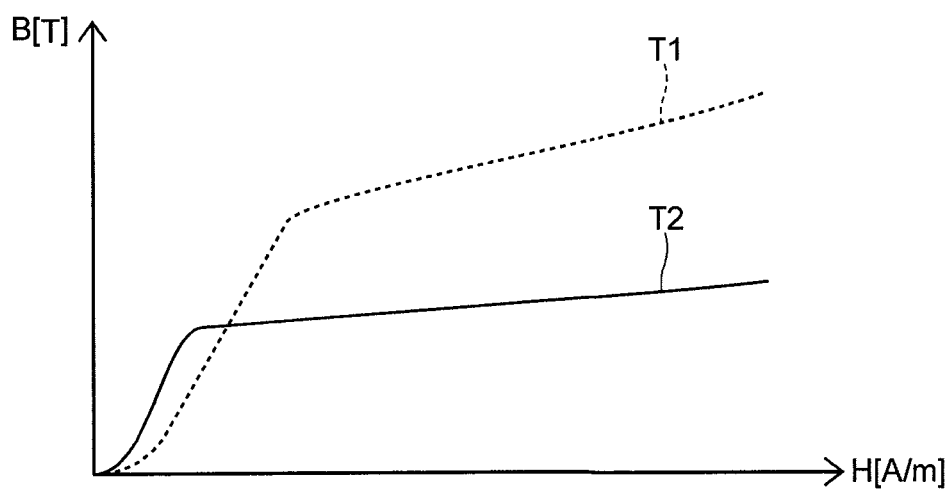
FIG. 4 is an explanatory view of a magnetic characteristic of a material of the stator.

FIG. 4 is an explanatory view showing a magnetizing property of a material of the stator. In FIG. 4, intensity of magnetic field (unit: H[A/m]) is taken on an axis of abscissas, and magnetic flux density (unit: B[T]) is taken on an axis of ordinates.

In case of the steel plate such as a laminated rolled magnetic steel plate, SPCC or S45C, when intensity of magnetic field is increased, the magnetic flux density is saturated when the intensity of magnetic field becomes or exceeds certain intensity. Here, although the laminated rolled magnetic steel plate can acquire high magnetic flux density (T1), in case of SPCC and S45C, the magnetic flux density is saturated at lower magnetic flux density (T2). That is, with the use of the laminated rolled magnetic steel plate as a material of the stator 200, the stator 200 can acquire the higher magnetic flux density so that a detection level of a detection signal can be elevated. Accordingly, with the use of SPCC or S45C as a material of the stator 200, the magnetic flux density is low so that a detection level of a detection signal is lowered.

On the other hand, the laminated rolled magnetic steel plate possesses not only a property that a material cost is high but also a property that the laminated rolled magnetic steel plate is vulnerable to bending in bending press forming so that it is difficult to ensure forming accuracy and reliability in bending. To the contrary, SPCC or S45C has properties that a material cost is inexpensive and exhibits toughness against bending in bending press forming so that it is easy to ensure forming accuracy and reliability after bending. Accordingly, by adopting SPCC or S45C as a material of the stator 200 and by forming the salient pole portions by bending as shown in FIG. 1, it is possible to prepare the stator 200 using an inexpensive material. Further, even when a detection level is low, it does not lead to the lowering of detection accuracy. Accordingly, by amplifying a detection level of a detection signal or the like, it is possible to realize the reduction of cost of the resolver without lowering the detection accuracy.

Further, in the embodiment 1, it is desirable that a distal end of each salient pole portion has a T shape, and a winding member for excitation and a winding member for detection are wound around a support portion which supports a distal end portion of each salient pole portion.

Figure 5:
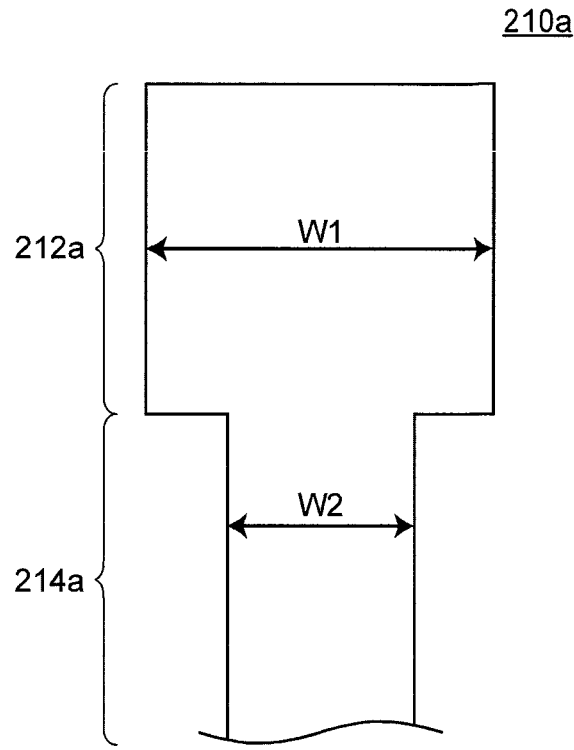
FIG. 5 is an explanatory view schematically showing a shape of the salient pole portion in the embodiment 1.

FIG. 5 is an explanatory view schematically showing a shape of the salient pole portion in the embodiment 1. Although FIG. 5 is a plan view showing a distal end portion of the salient pole portion 210a formed on the surface of the annular flat sheet, other salient pole portions have the same shape shown in FIG. 5.

The salient pole portion 210a includes a distal end portion 212a and a support portion 214a, and is formed such that the distal end of the salient pole portion 210a has a T shape. The distal end portion 212a and the support portion 214a having such constitution are raised from the surface of the flat sheet by bending. In a state where the distal end portion 212a and the support portion 214a are raised from the surface of the flat sheet, a width W1 of a surface of the distal end portion 212a which faces the rotor 300 in an opposed manner (width of the rotor 300 in the rotational direction) is larger than a width W2 of a surface of the support portion 214a which faces the rotor 300 in an opposed manner (width of the rotor 300 in the rotational direction). The winding member for excitation shown in FIG. 2(a) and the winding member for detection shown in FIG. 2(b) are provided in such a manner that these winding members are wound around an outer side of the support portion 214a.

In this manner, by forming the distal end of the salient pole portion on which the winding member is mounted into a T shape, it is possible to reduce a change of magnetic efficiency with respect to the deviation of the rotor 300 in the axial direction. Accordingly, the influence of a change in magnetic flux in the vicinity of the winding member can be reduced so that the detection accuracy of a rotational angle of the rotor 300 relative to the stator 200 can be enhanced. Further, by adopting a T shape as the shape of the distal end of the salient pole portion, even when the number of salient pole portions is increased, it is possible to suppress the decrease of a magnetic flux which passes through the winding magnetic core and hence, it is possible to suppress the lowering of the detection accuracy.

As described above, the resolver 100 of the embodiment 1 is constituted of the stator 200, the rotor 300 and the winding members. Accordingly, compared to the case where a resolver having the complicate structure is manufactured using a large number of parts as disclosed in patent document 1 or patent document 2, the number of parts can be largely reduced thus realizing the reduction of cost and the enhancement of reliability.

Further, by adopting the inexpensive magnetic materials which exhibit excellent forming accuracy in bending and high reliability as a material of the stator 200, it is possible to realize the manufacture of the resolver 100 at a low cost.

Figure 6:
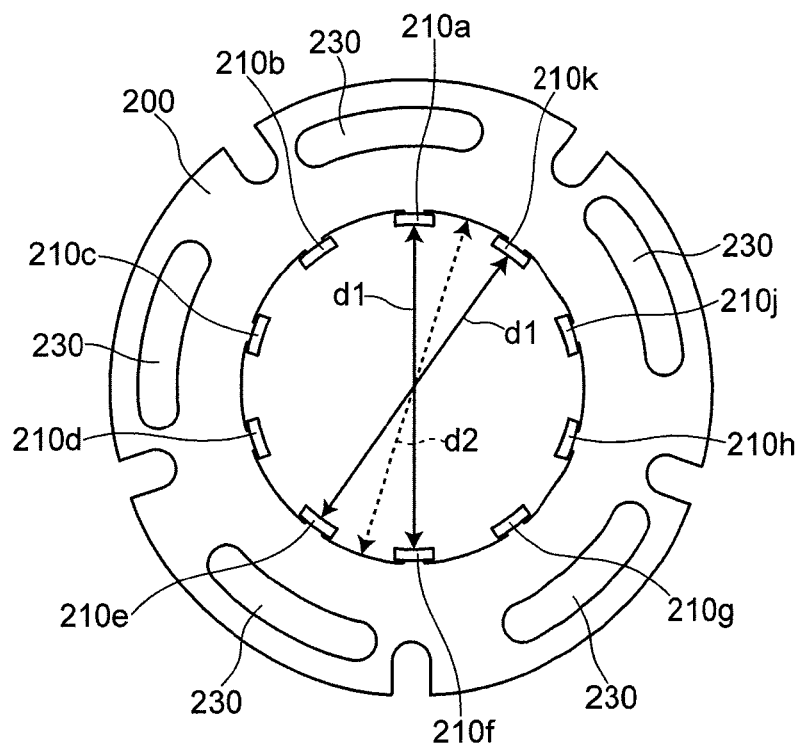
FIG. 6 is a top plan view of the stator in the embodiment 1.

FIG. 6 is a top plan view of the stator 200 according to the embodiment 1. In FIG. 6, parts identical with the parts shown in FIG. 1 are given the same symbols and their explanation is omitted when appropriate.

In the stator 200 according to the embodiment 1, as shown in FIG. 6, the salient pole portions are raised from the surface of the flat sheet by bending press forming so that no undesired projections are formed on an inner side of the stator 200. That is, a minimum inner diameter of the stator 200 after bending becomes an inner diameter d1 at each salient pole portion. To be more specific, with respect to the inner diameter of the stator 200, the inner diameter d1 of the stator 200 at each salient pole portion is smaller than the inner diameter d2 of the stator 200 at a portion between two neighboring salient pole portions. In this manner, by forming the salient pole portions such that the undesired projections are not formed on the inner side of the stator 200, the magnetic efficiency is enhanced by a magnetic circuit by way of the salient pole portions thus increasing a transformation ratio of the resolver 100.

As described above, according to the embodiment 1, it is possible to realize the increase of a transformation ratio as well as the reduction of cost and the enhancement of reliability without lowering detection accuracy.

Next, a method of manufacturing the resolver 100 of the embodiment 1 which has the above-mentioned constitution and can acquire the above-mentioned advantages is explained.

Figure 7:
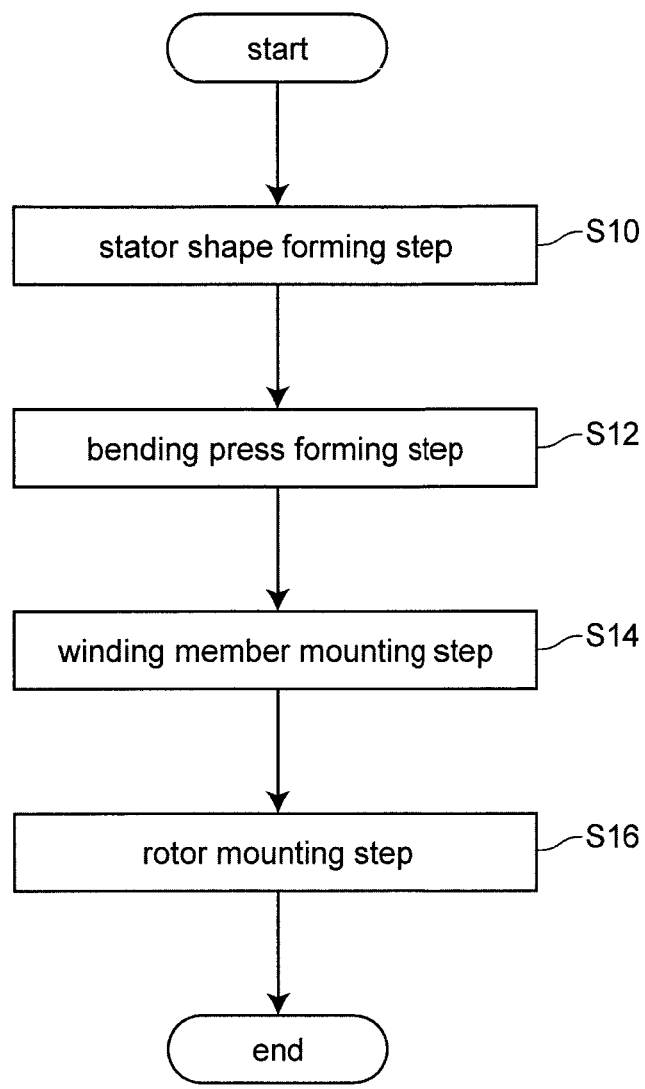
FIG. 7 is a flowchart of one example of a method of manufacturing the resolver of the embodiment 1.

FIG. 7 is a flowchart showing one example of the method of manufacturing the resolver 100 of the embodiment 1. For example, a manufacturing apparatus of the resolver 100 executes treatment in respective steps in accordance with the flow shown in FIG. 7.

Figure 8:
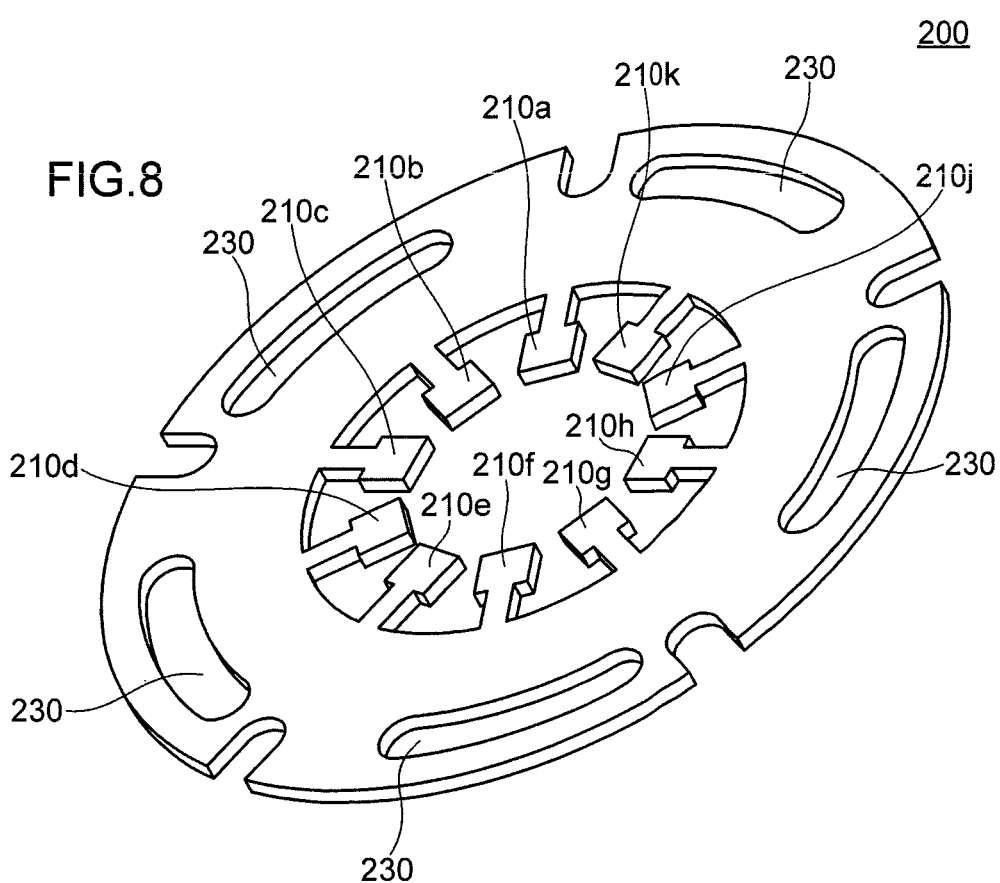
FIG. 8 is a perspective view of the stator in the embodiment 1 before bending press forming.

FIG. 8 is a perspective view of the stator 200 according to the embodiment 1 before bending press forming. In FIG. 8, parts identical with the parts shown in FIG. 1 are given the same symbols and their explanation is omitted when appropriate.

Figure 9:
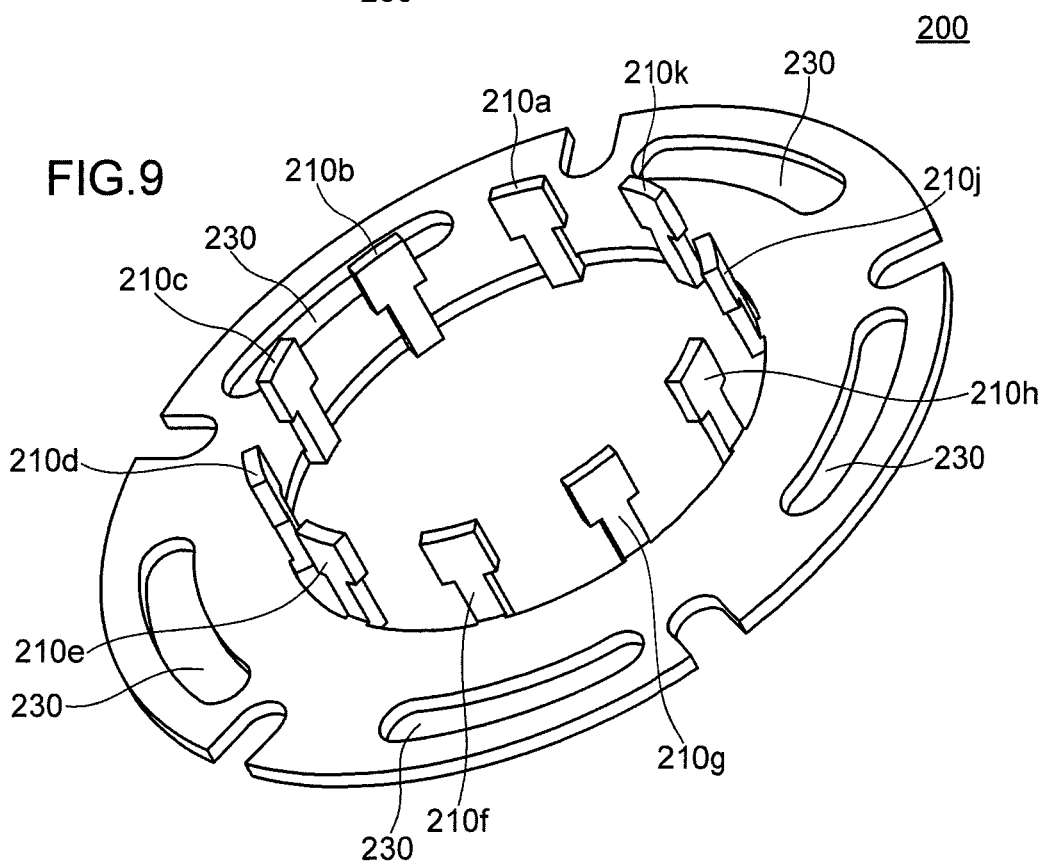
FIG. 9 is a perspective view of the stator in the embodiment 1 after bending press forming.

FIG. 9 is a perspective view of the stator 200 according to the embodiment 1 after bending press forming. In FIG. 9, parts identical with the parts shown in FIG. 8 are given the same symbols and their explanation is omitted when appropriate.

Figure 10:
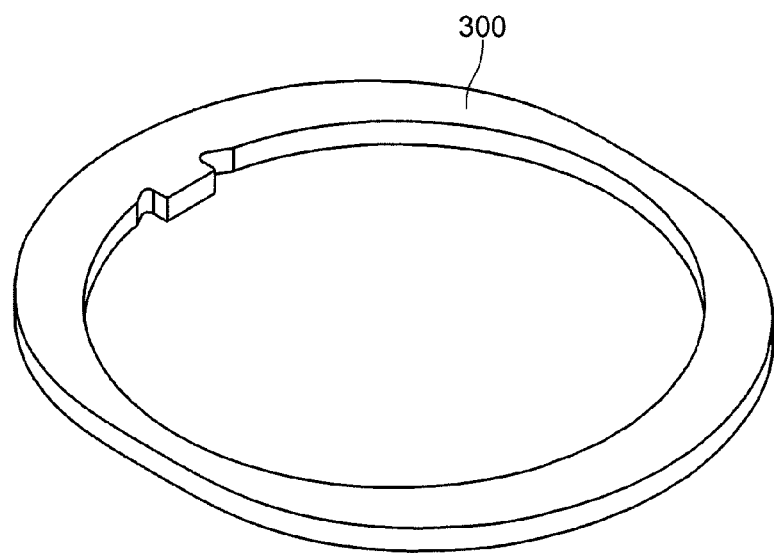
FIG. 10 is a perspective view of a rotor of the embodiment 1.

FIG. 10 is a perspective view of the rotor 300 according to the embodiment 1.

With respect to the resolver 100 according to the embodiment 1, firstly, a shape of the stator 200 is formed in a stator shape forming step (step S10). Thereafter, in a bending press forming step (bending step), the salient pole portions of the flat sheet-like stator 200 are bent so that a plurality of salient pole portions are raised from the surface of the flat sheet (step S12). Then, in a winding member mounting step, using each one of the salient pole portions 210a to 210k raised in step S12 as a winding magnetic core, the winding members are mounted on an outer side of each salient pole portion (step S14).

That is, in the stator shape forming step in step S10, to perform the bending press forming in step S12, as shown in FIG. 8, the salient pole portions 210a to 210k and the mounting holes 230 are formed on an inner-side brim portion of an annular flat sheet made of SPCC which is common steel or S45C which is carbon steel for machine structural use by press forming thus forming a shape of the stator 200. Here, as explained in conjunction with FIG. 5, the stator 200 is formed such that the distal end of each one of the salient pole portions 210a to 210k has a T shape.

Then, in step S12, as shown in FIG. 9, the plurality of salient pole portions which are formed in step S10 are raised by bending press forming. As a result, the salient pole portions 210a to 210k are raised such that the salient pole portions 210a to 210k become approximately perpendicular to the surface of the flat sheet of the stator 200. Accordingly, it is possible to form the stator 200 such that the minimum inner diameter of the stator 200 after bending becomes the inner diameter of each salient pole portion.

The winding member for excitation and the winding member for detection are mounted on the respective salient pole portions raised in this manner such that the winding member for excitation and the winding member for detection are wound around the support portion which supports the distal end portion in each salient pole portion.

Next, in a separate step, the rotor 300 is formed by press forming as shown in FIG. 10. Although the rotor 300 is an annular flat sheet in the embodiment 1, the rotor 300 has a shape where an outer-diameter-side outer profile line changes in two cycles as viewed in a plan view. Then, in a rotor mounting step, the rotor 300 having the shape shown in FIG. 10 is arranged on an inner side of the stator 200 such that the rotor 300 is rotatable relative to the stator 200 (step S16). To be more specific, in the rotor mounting step, the rotor 300 is provided rotatably relative to the stator 200 such that the gap permeance between an outer side of the rotor 300 and each salient pole portion of the stator 200 changes due to the rotation of the rotor 300 about a rotational axis. The resolver 100 according to the embodiment 1 shown in FIG. 1 is manufactured in the above-mentioned manner.

As explained heretofore, according to the embodiment 1, it is possible to manufacture the resolver 100 having small number of parts by a simple method at a low cost without lowering detection accuracy.

In the embodiment 1, it is possible to output digital data corresponding to a rotational angle based on a 2-phase detection signal from the above-mentioned resolver 100 according to the embodiment 1.

Figure 11:
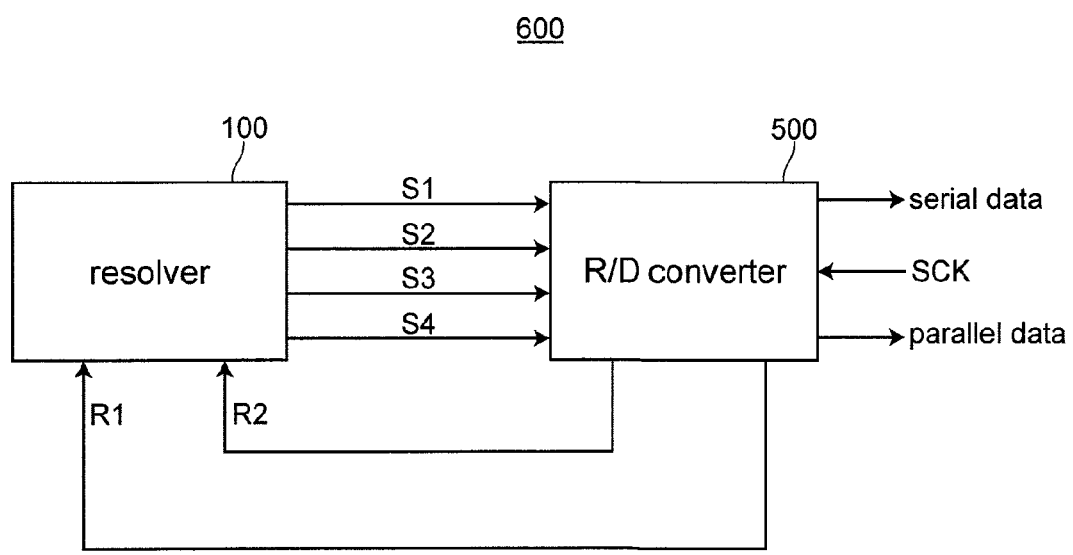
FIG. 11 is a functional block diagram of a constitutional example of an angle detection system of the embodiment 1.

FIG. 11 is a functional block diagram of a constitutional example of an angle detection system according to the embodiment 1. Although an R/D converter is provided outside the resolver 100 in FIG. 11, the resolver 100 may incorporate the R/D converter therein.

The angle detection system 600 according to the embodiment 1 includes the above-mentioned resolver 100 and the R/D converter (converter or converting device in broader meaning) 500. The resolver 100 includes the stator and the rotor which is provided rotatably relative to the stator. In an excitation state generated in response to an excitation signal of one phase given between winding terminals R1, R2, the resolver 100 outputs detection signals of two phases generated between winding terminals S1 to S4 corresponding to rotational angles of the rotor relative to the stator. The R/D converter 500 generates the excitation signals R1, R2 fed to the resolver 100, generates digitized signals corresponding to the detection signals of two phases generated between the winding terminals S1 to S4 from the resolver 100, and outputs the digitized signals as serial data or parallel data.

Figure 12:
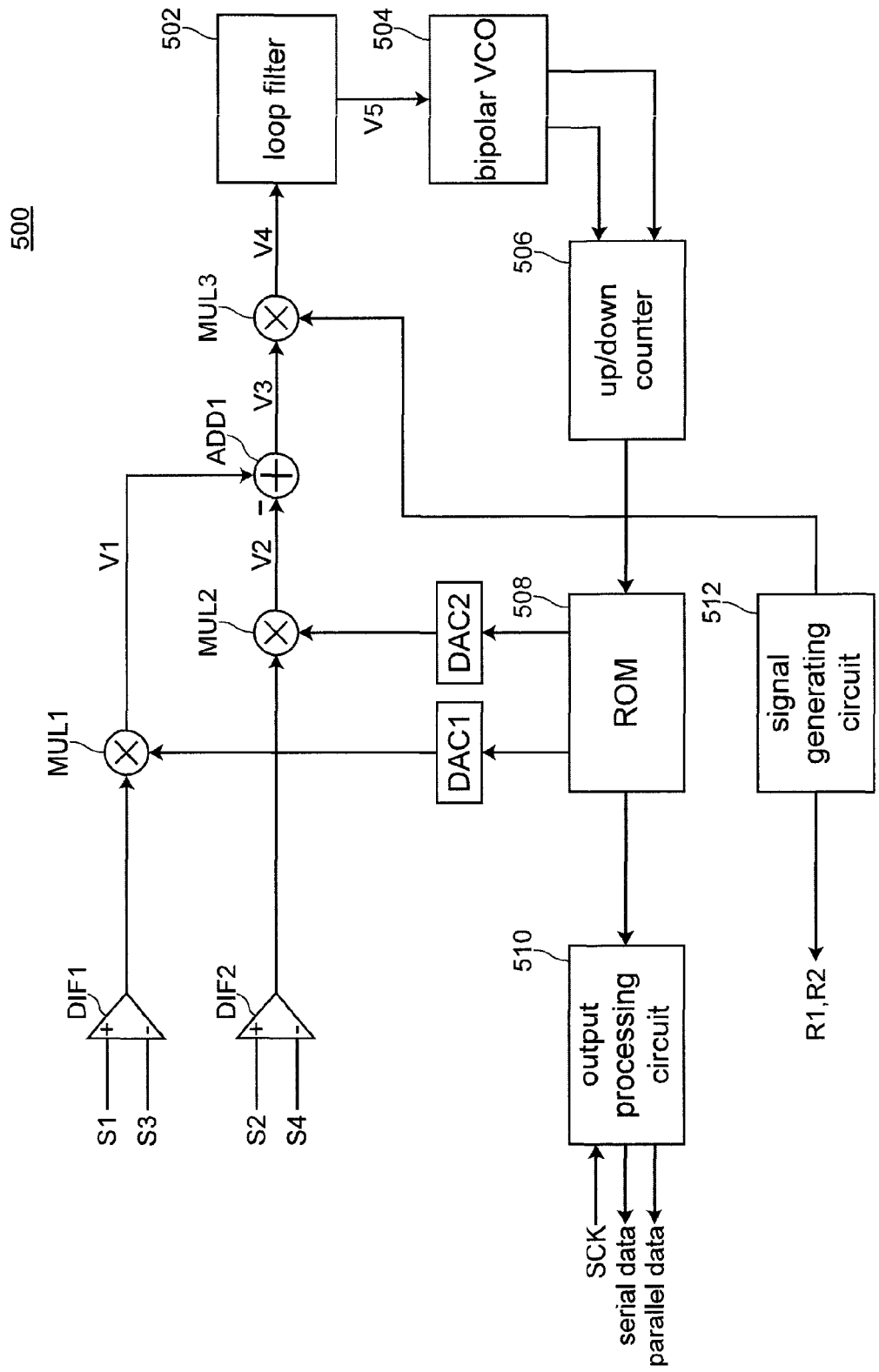
FIG. 12 is a functional block diagram of an RID converter shown in FIG. 11.

FIG. 12 is a functional block diagram of the R/D converter 500 shown in FIG. 11.

The R/D converter 500 includes differential amplifiers DIF1, DIF2, multipliers MUL1 to MUL3, an adder ADD1, a loop filter 502, a bipolar VCO (Voltage Controlled Oscillator) 504, an up/down counter 506, a ROM (Read Only Memory) 508, digital analogue converters DAC1, DAC2, an output processing circuit 510, and a signal generating circuit 512.

The signal generating circuit 512 generates an excitation signal $E_{R1-R2}$ between terminals R1, R2 of the winding and feeds the excitation signal $E_{R1-R2}$ to the resolver 100. In a following formula, $V_E$ is an amplitude voltage, $\omega_0$ is frequency, and t is time.

$$E_{R1-R2} = V_E \sin \omega t \quad \text{[Formula 1]}$$

In a state excited with such an excitation signal, the resolver 100 outputs detection signals of two phases corresponding to rotational angles θ(t). Out of the detection signals of two phases, the detection signal (a differential $E_{S1-S3}$ between voltages of winding terminals S1, S3) is expressed by a following formula. Further, out of the detection signals of two phases, the detection signal (a differential $E_{S2-S4}$ between voltages of the winding terminals S2, S4) is expressed by a following formula. In the following formula, L is a transformation ratio.

$$E_{S1-S3} = L \cdot V_E \sin \omega_0 t \cdot \cos \theta(t)$$

$$E_{S2-S4} = L \cdot V_E \sin \omega_0 t \cdot \sin \theta(t) \quad \text{[Formula 2]}$$

The differential amplifier DIF1 amplifies the detection signal of the first phase (the differential between the voltages of the winding terminals S1, S3) from the resolver 100, and outputs the amplified signal $E_{S1-S3}$ after amplification. The differential amplifier DIF2 amplifies the detection signal of the second-phase (the differential between the voltages of the winding terminals S2, S4) from the resolver 10, and outputs the amplified signal $E_{S2-S4}$ after amplification.

Digital values of a sin signal and a cos signal corresponding to an arbitrary angle φ(t) are stored in the ROM 508. The digital analogue converter DAC1 outputs an analogue value of the sin signal corresponding to the angle φ(t), and the digital analogue converter DAC2 outputs an analogue value of the cos signal corresponding to the angle φ(t). Accordingly, the multipliers MUL1, MUL2 output signals V1, V2 expressed by following formulae respectively.

$$V1 = V_0 \cdot \sin \omega_0 t \cdot \cos \phi(t) \cdot \sin \phi(t)$$

$$V2 = V_0 \cdot \sin \omega_0 t \cdot \sin \phi(t) \cdot \cos \phi(t) \quad \text{[Formula 3]}$$

Then, the adder ADD1 generates a signal V3 (=V1−V2) using the signals V1, V2 generated by the multipliers MUL1, MUL2. As a result, the adder ADD1 outputs the signal V3 expressed by a following formula. In the next formula, "sin $\omega_0 t$" is converted into "−cos ($\omega_0 t + \pi/2$)".

$$V4 = \quad \text{[Formula 5]}$$
$$V3 \cos(\omega_0 t + \pi/2) = V_0 \cos^2(\omega_0 t + \pi/2) \cdot \sin(\theta(t) - \phi(t)) =$$
$$(1 - \cos 2\omega_0 t / 2) V_0 \cdot \sin(\theta(t) - \phi(t))$$

Then, the coherent detection with respect to the signal V3 is performed by the multiplier MUL3. In the synchronous detection, a signal V4 is obtained by multiplying cos ($\omega_0 t + \pi/2$) generated by the signal generation circuit 512 by the signal V3. The signal V4 is expressed by a following formula.

$$V3 = V1 - V2 \quad \text{[Formula 4]}$$
$$= -V_0 \cos(\omega_0 t + \pi/2) \cdot \cos\theta(t) \cdot \sin\phi(t) +$$
$$V_0 \cos(\omega_0 t + \pi/2) \cdot \sin\theta(t) \cdot \cos\phi(t)$$
$$= V_0 \cos(\omega_0 t + \pi/2) \cdot \sin(\theta(t) - \phi(t))$$

The loop filter 502 outputs a signal V5 which is obtained by cutting out high frequency components of the signal V4. Accordingly, as a result of cutting out a cos side in the above-mentioned formula as the high frequency component, the signal V5 is expressed by a following formula.

$$V5 = (\tfrac{1}{2}) V_0 \cdot \sin(\theta(t) - \phi(t)) \quad \text{[Formula 6]}$$

The bipolar VCO 504 outputs a pulse signal having a frequency proportional to an absolute value of the signal V5 which is an output signal of the loop filter 502, and a polarity signal corresponding to a polarity of the signal V5. The up/down counter 506 performs an up count during an active period of a pulse signal when the polarity signal from the bipolar VCO 504 indicates positive polarity, and performs a down count during an active period of a pulse signal when the polarity signal from the bipolar VCO 504 indicates negative polarity. A count value of this up/down counter 506 is a digital value of an angle ϕ(t).

As described above, the ROM 508 outputs a digital value of a sin signal and a digital value of a cos signal corresponding to an angle ϕ(t). By making use of a phenomenon that the angle ϕ(t) is changed corresponding to θ(t), the output processing circuit 510 outputs a digital value (digitized signal) of the angle ϕ(t) as serial data or parallel data in synchronism with a serial clock SCK.

The serial data or the parallel data which is an output value of the R/D convertor 500 as described above is outputted to a processing circuit on a succeeding stage. This processing circuit can realize processing corresponding to a rotational angle of the rotor relative to the stator by executing processing corresponding to the serial data or the parallel data from the angle detection system 600.

The present invention is not limited to the constitution of the R/D convertor 500 and the content of the processing executed by the R/D convertor 500. The R/D convertor according to the present invention may be any convertor which can convert a signal from the resolver 100 into a digitized signal (digital value).

First Modification of Embodiment 1

The resolver 100 according to the embodiment 1 is exemplified using the example where the salient pole portions formed on the stator 200 constitute the winding magnetic core and the coil windings are mounted on the salient pole portions as the winding members. However, the present invention is not limited to such a constitution. The winding members mounted on the salient pole portions of the stator may be realized by a multi-layered substrate in which a coil portion is formed on each layer, for example.

Figure 13:
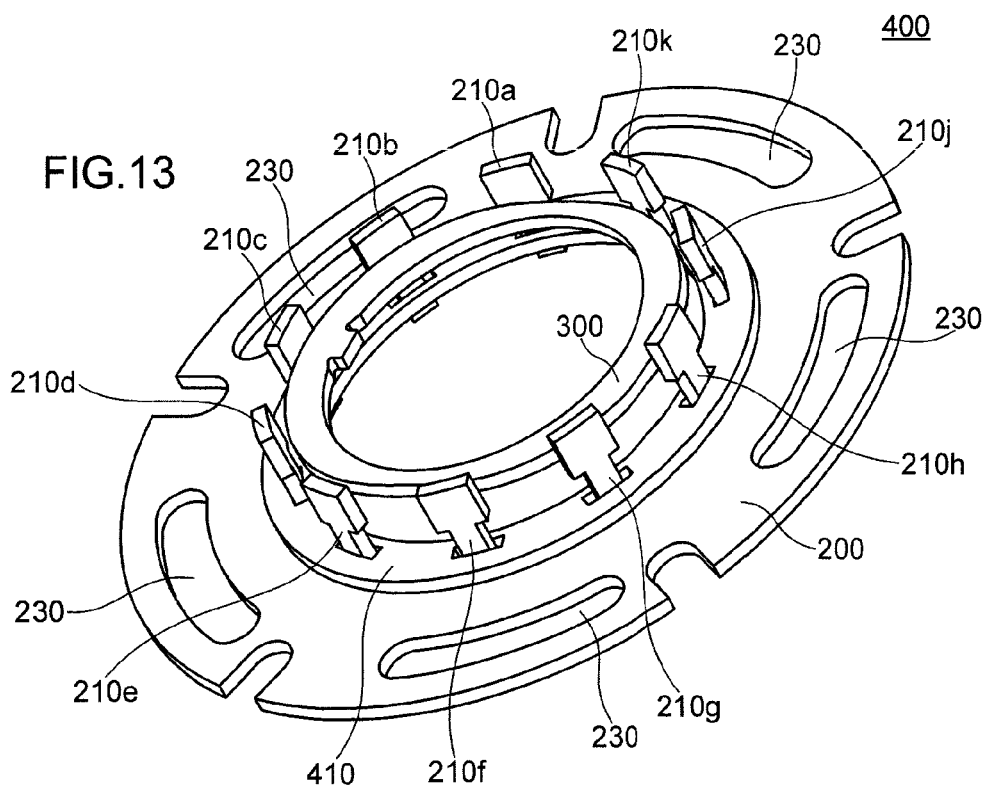
FIG. 13 is a perspective view of a constitutional example of a resolver according to a first modification of the embodiment 1.

FIG. 13 is a perspective view of a constitutional example of a resolver according to a first modification of the embodiment 1. The illustration of wiring is omitted in FIG. 13. In FIG. 13, parts identical with the parts shown in FIG. 1 are given the same symbols, and their explanation is omitted when appropriate.

The resolver 400 according to the first modification of the embodiment 1 is a so-called inner-rotor-type angle detection device. The resolver 400 according to the first modification of the embodiment 1 differs from the resolver 100 according to the embodiment 1 with respect to the point that winding members which are wound around an outer side of a support portion of each salient pole portion out of salient pole portions 210a to 210k of the stator 200 are not formed of a coil winding but of a multi-layered substrate 410.

Here, the multi-layered substrate 410 is formed by stacking insulation substrates on each of which a spiral conductive layer which functions as an exciting coil portion and a detecting coil portion of each salient pole portion of the salient pole portions 210a to 210k of the stator 200 are mounted on respective layers. The coil portions of the respective layers are electrically connected with each other via through holes formed in the insulation substrates on the respective layers. Openings through which the salient pole portions 210a to 210k formed on the stator 200 pass are formed in the multi-layered substrate 410. By allowing the respective salient pole portions to pass through the openings, as shown in FIG. 13, the exciting coil portion and the detecting coil portion are wound around the outside of each salient pole portion.

According to the first modification of the embodiment 1, in addition to the advantageous effect obtained by the embodiment 1, the winding member for excitation and the winding member for detection can be formed with high accuracy in accordance with specifications so that the deviation of conductance of the winding member for excitation and the winding member for detection can be minimized thus enhancing detection accuracy. Further, the number of turns of winding member for excitation and the number of turns of the winding member for detection can be adjusted corresponding to the number of substrates to be stacked and hence, a winding ratio can be easily adjusted.

The angle detection system 600 shown in FIG. 11 can adopt the resolver 400 of the first modification of the embodiment 1 in place of the resolver 100.

Second Modification of Embodiment 1

The resolver 100 according to the embodiment 1 has been explained by assuming that the distal end of the salient pole portion formed on the stator 200 has a T shape. However, the present invention is not limited to such structure. The salient pole portion of the stator may have a so-called I shape.

Figure 14:
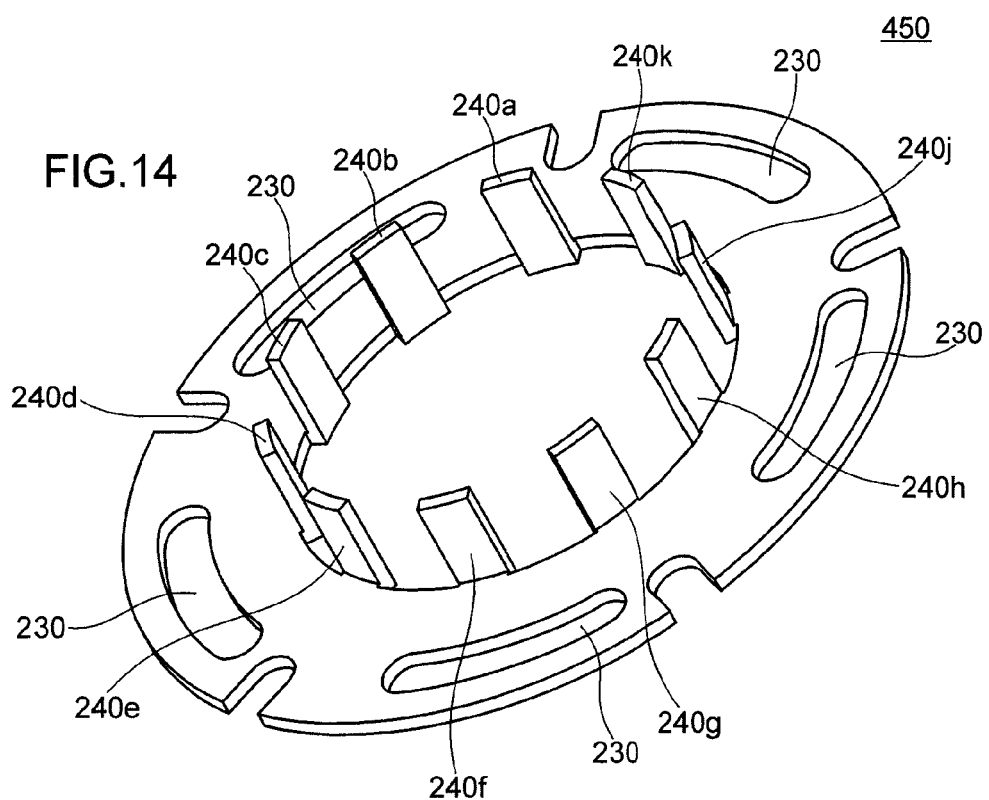
FIG. 14 is a perspective view of a constitutional example of a stator according to a second modification of the embodiment 1.

FIG. 14 is a perspective view of a constitutional example of a stator according to a second modification of the embodiment 1. In FIG. 14, parts identical with the parts shown in FIG. 9 are given the same symbols, and their explanation is omitted when appropriate.

The stator 450 according to the second modification of the embodiment 1 includes, on an annular flat sheet made of a magnetic material, ten salient pole portions 240a, 240b, 240c, 240d, 240e, 240f, 240g, 240h, 240j, 240k which are formed by raising from a surface of the flat sheet. These salient pole portions are formed on an inner brim portion of the annular flat sheet, and a winding member for excitation and a winding member for detection are mounted on each salient pole portion as a winding magnetic core. Each salient pole portion has a so-called I shape so that a width of a distal end portion of the salient pole portion and a width of a support portion of the salient pole portion are approximately equal to each other.

Also in FIG. 14, a projection is not formed between the salient pole portions on an inner side of the stator 450, and a minimum inner diameter of the stator 450 after bending becomes an inner diameter of the stator 450 at each salient pole portion.

FIG. 15 is a perspective view of a constitutional example of a resolver according to the second modification of the embodiment 1. The illustration of wiring is omitted in FIG. 15. In FIG. 15, parts identical with the parts shown in FIG. 1 or FIG. 14 are given the same symbols, and their explanation is omitted when appropriate.

The resolver 480 according to the second modification of the embodiment 1 is a so-called inner-rotor-type angle detection device. The resolver 480 according to the second modification of the embodiment 1 differs from the resolver 100 according to the embodiment 1 with respect to the point that a distal end of the salient pole portion of the stator has an I shape.

According to such second modification of the embodiment 1, the manufacturing steps can be simplified compared to the manufacture of the stator of the embodiment 1 and, in the same manner as the embodiment 1, it is possible to realize the reduction of cost and the enhancement of reliability while reducing the number of parts. Further, according to the second modification, a magnetic flux which passes through the winding magnetic core can be increased and hence, it is possible to further enhance detection accuracy when the number of salient pole portions is small.

Further, the second modification of the embodiment 1 shown in FIG. 15 also can, by adopting the multi-layered substrate as the winding member in the same manner as FIG. 13, acquire the substantially same advantageous effects as the first modification of the embodiment 1.

The angle detection system 600 shown in FIG. 11 can adopt the resolver 480 of the second modification of the embodiment 1 in place of the resolver 100.

Embodiment 2

The resolver of the embodiment 1 or the modification of the embodiment 1 has been explained assuming that the resolver is a so-called inner-rotor-type angle detection device. However, the present invention is not limited to such a resolver, and the resolver which constitutes the angle detection device according to the present invention may be a so-called outer-rotor-type angle detection device.

FIG. 16 is a perspective view of a constitutional example of a resolver according to an embodiment 2 of the present invention. In FIG. 16, the illustration of wiring is omitted. Although the explanation is made, in FIG. 16, by taking a 1-phase excitation and 2-phase output type resolver which has fourteen salient pole portions as an example, the present invention is not limited to such a resolver.

The resolver 700 in the embodiment 2 is a so-called outer-rotor type angle detection device. That is, a rotor is arranged outside a stator, and a signal from detection winding mounted on the stator is changed corresponding to a rotational angle of the rotor.

The resolver 700 of the embodiment 2 includes the stator (stationary part) 800 and the rotor (rotary part) 900. The stator 800 includes, on an annular flat sheet made of a magnetic material, fourteen salient pole portions 810a, 810b, 810c, 810d, 810e, 810f, 810g, 810h, 810j, 810k, 810m, 810n, 810p, 810q which are formed by raising from a surface of the flat sheet. These salient pole portions are formed on an outer brim portion of the annular flat sheet. That is, the salient pole portions are arranged outside a profile line of the annular flat sheet on an outer diameter side. Out of surfaces of each salient pole portion, at least a surface which faces the rotor 900 is not a flat surface, and is formed so as to constitute a portion of a circle which uses a point positioned on an inner side of the annular flat sheet as the center thereof as viewed along the direction of the rotary shaft of the rotor 900.

Further, a winding member for excitation and a winding member for detection are mounted on each salient pole portion which works as a winding magnetic core. That is, the winding members 820a for excitation and detection are mounted on the salient pole portion 810a which works as the winding magnetic core. The winding members 820b for excitation and detection are mounted on the salient pole portion 810b which works as the winding magnetic core. The winding members 820c for excitation and detection are mounted on the salient pole portion 810c which works as the winding magnetic core. The winding members 820d for excitation and detection are mounted on the salient pole portion 810d which works as the winding magnetic core. The winding members 820e for excitation and detection are mounted on the salient pole portion 810e which works as the winding magnetic core. The winding members 820f for excitation and detection are mounted on the salient pole portion 810f which works as the winding magnetic core. The winding members 820g for excitation and detection are mounted on the salient pole portion 810g which works as the winding magnetic core. The winding members 820h for excitation and detection are mounted on the salient pole portion 810h which works as the winding magnetic core. The winding members 820j for excitation and detection are mounted on the salient pole portion 810j which works as the winding magnetic core. The winding members 820k for excitation and detection are mounted on the salient pole portion 810k which works as the winding magnetic core. Further, the winding members 820m for excitation and detection are mounted on the salient pole portion 810m which works as the winding magnetic core. The winding members 820n for excitation and detection are mounted on the salient pole portion 810n which works as the winding magnetic core. The winding members 820p for excitation and detection are mounted on the salient pole portion 810p which works as the winding magnetic core. The winding members 820q for excitation and detection are mounted on the salient pole portion 810q which works as the winding magnetic core.

The salient pole portions 810a to 810q which the stator 800 includes are formed on a flat sheet in advance and, thereafter, are raised by bending press forming (broadly bending) such that the salient pole portions 810a to 810q become perpendicular to a surface of the flat sheet.

Further, a plurality of mounting holes 830 (7 holes in FIG. 16) which are elongated in the circumferential direction than in the radial direction are formed in the stator 800. Fixing members not shown in the drawing are made to penetrate through these mounting holes 830 thus fixing the stator 800 to a fixing plate for fixing the resolver 700. By forming the mounting holes 830 in such a manner that the mounting holes 830 are elongated in the circumferential direction of the stator 800, it is possible to easily perform the fine adjustment of a fixing position of the resolver 700 with respect to the rotational direction of the rotor 900.

The rotor 900 is made of a magnetic material and is provided in a rotatable manner relative to the stator 800. To be more specific, the rotor 900 is provided in a rotatable manner relative to the stator 800 such that gap permeance between the rotor 900 and each salient pole portion of the stator 800 is changed due to the rotation of the rotor 900 about a rotational axis thereof.

In the embodiment 2, the winding directions of the windings of the winding members 820a to 820q which are mounted on the salient pole portions 810a to 810q respectively are substantially equal to the winding direction of the windings in FIG. 2(a) and FIG. 2(b) explained in conjunction with the embodiment 1 and hence, the detailed explanation of the winding directions of the windings is omitted. That is, in the embodiment 2, as shown in FIG. 2(a), the winding member for excitation is provided such that the winding directions of the winding member mounted on the salient pole portions arranged adjacent to each other become opposite to each other. The winding member for excitation mounted on each salient pole portion may be formed of a coil winding, for example. An excitation signal is applied between terminals R1, R2 of the winding which constitutes such winding member for excitation.

Further, in the embodiment 2, as shown in FIG. 2(b), to obtain a 2-phase detection signal, the winding member for detection is constituted of two sets of winding members. The winding member for detection for obtaining a detection signal of a first phase (for example, SIN phase) of the 2-phase detection signal is wound around the respective salient pole portions for every one other in the counter clockwise direction from the salient pole portion 810a to the salient pole portion 810p, for example. On the other hand, the winding member for detection for obtaining a detection signal of a second phase (for example, COS phase) of the 2-phase detection signal is wound around the respective salient pole portions for every one other in the counter clockwise direction from the salient pole portion 810*q* to the salient pole portion 810*n*, for example. The detection signal of the first phase is detected as a signal between the windings S1, S3, and the detection signal of the second phase is detected as a signal between the windings S2, S4. The winding member for detection which is mounted on each salient pole portion may be formed of a coil winding, for example.

In the embodiment 2, the winding direction of the winding member for excitation is not limited to the direction shown in FIG. 2(*a*). Further, in the embodiment 2, the winding direction of the winding member for detection is not limited to the direction shown in FIG. 2(*b*).

The winding member is mounted on each salient pole portion of such a stator 800. When the rotor 900 is rotated, a magnetic circuit is formed between the salient pole portions arranged adjacent to each other by way of the rotor 900. Here, in the same manner as the embodiment 1, the winding member is mounted on the respective salient pole portions such that the directions of the magnetic fluxes which pass through the neighboring salient pole portions become opposite to each other. As a result, due to the rotation of the rotor 900, corresponding to a change of gap permeance between the rotor 900 and each salient pole portion, an electric current which is generated in the winding member wound around each salient pole portion is also changed. For example, an electric current generated in the winding member takes a sinusoidal wave form.

In the resolver 700 having the above-mentioned constitution, in the same manner as the embodiment 1, it is desirable that a material of the stator 800 made of a magnetic material is SPCC (one steel plate) which is common steel or S45C which is carbon steel for machine structural use (one steel plate) rather than a laminated rolled magnetic steel plate.

Still further, in the embodiment 2, in the same manner as the embodiment 1, it is desirable that a distal end of each salient pole portion has a T shape, and a winding member for excitation and a winding member for detection are wound around a support portion which supports a distal end portion of each salient pole portion.

Figure 17:
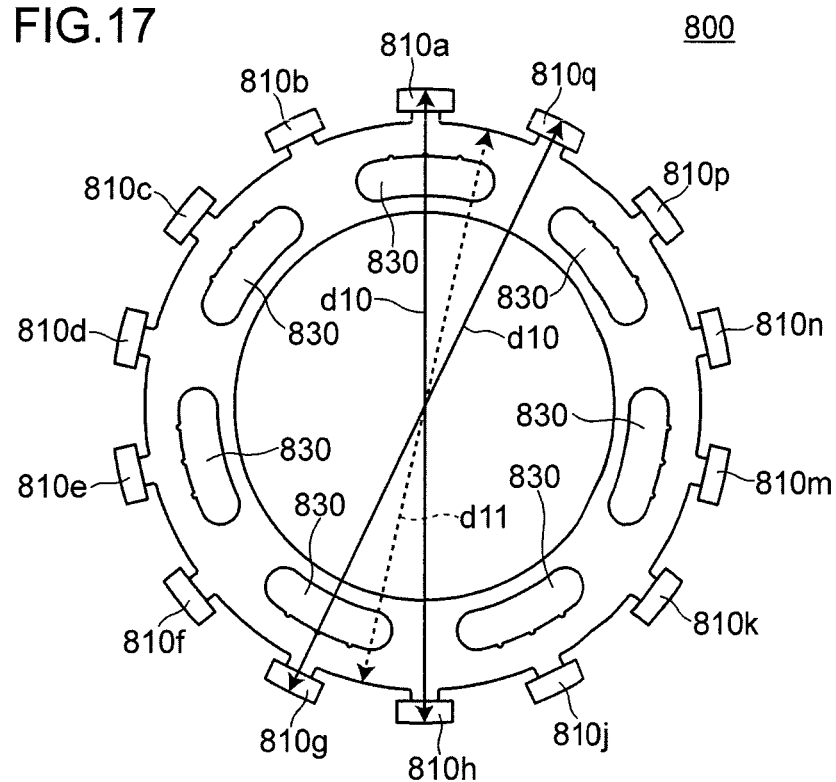
FIG. 17 is a top plan view of a stator of the embodiment 2.

FIG. 17 is a top plan view of the stator 800 according to the embodiment 2. In FIG. 17, parts identical with the parts shown in FIG. 16 are given the same symbols and their explanation is omitted when appropriate.

In the stator 800 according to the embodiment 2, the salient pole portions are raised from the surface of the flat sheet by bending press forming so that no undesired projections are formed on an outer diameter side of the stator 800. That is, a maximum outer diameter of the stator 800 after bending press forming is an outer diameter d10 at each salient pole portion. To be more specific, with respect to the outer diameter of the stator 800, the outer diameter d10 of the stator 800 at each salient pole portion is larger than an outer diameter d11 of the stator 800 between two neighboring salient pole portions. In this manner, by forming the salient pole portions such that the undesired projections are not formed on the outer diameter side of the stator 800, the magnetic efficiency is enhanced by a magnetic circuit by way of the salient pole portions thus increasing a transformation ratio of the resolver 700.

In this manner, according to the embodiment 2, it is possible to realize the increase of a transformation ratio as well as the reduction of cost and the enhancement of reliability without lowering detection accuracy.

Next, the resolver 700 of the embodiment 2 which has the above-mentioned constitution and can acquire the above-mentioned advantages can be manufactured by a manufacturing method equal to the manufacturing method of the embodiment 1. Accordingly, a flowchart of the method of manufacturing the resolver 700 of the embodiment 2 is omitted.

Figure 18:
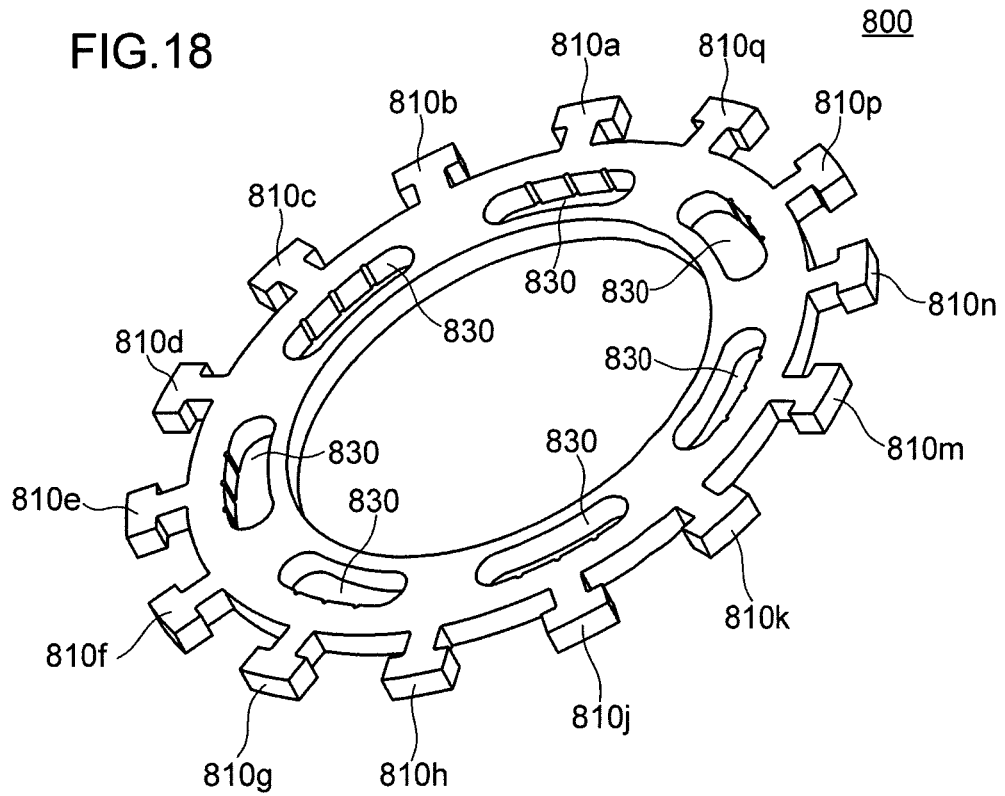
FIG. 18 is a perspective view of the stator of the embodiment 2 before bending press forming.

FIG. 18 is a perspective view of the stator 800 according to the embodiment 2 before bending press forming. In FIG. 18, parts identical with the parts shown in FIG. 16 are given the same symbols and their explanation is omitted when appropriate.

Figure 19:
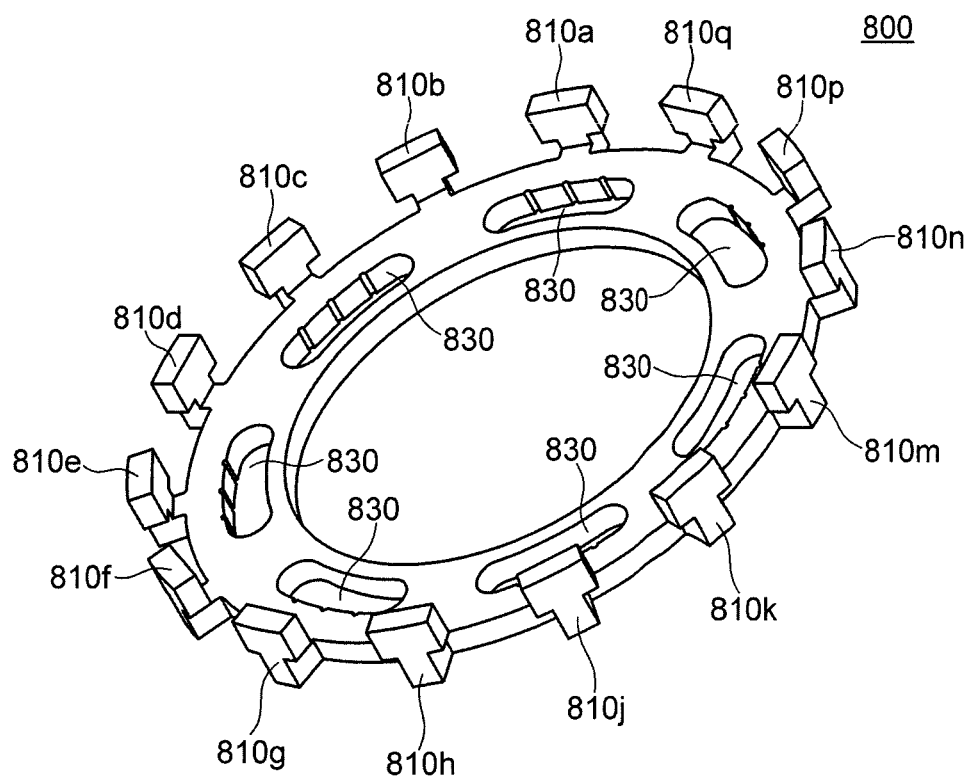
FIG. 19 is a perspective view of the stator of the embodiment 2 after bending press forming.

FIG. 19 is a perspective view of the stator 800 according to the embodiment 2 after bending press forming. In FIG. 19, parts identical with the parts shown in FIG. 18 are given the same symbols and their explanation is omitted when appropriate.

Figure 20:
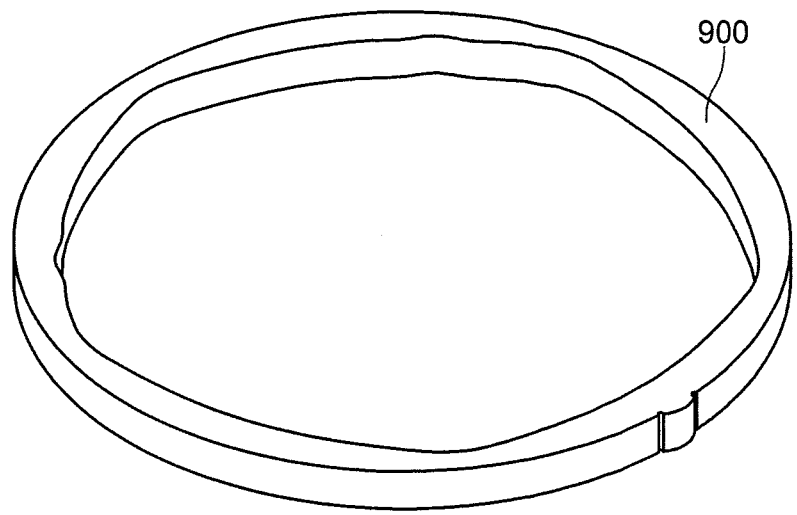
FIG. 20 is a perspective view of a rotor of the embodiment 2.

FIG. 20 is a perspective view of the rotor 900 according to the embodiment 2.

With respect to the resolver 700 according to the embodiment 2, firstly, a shape of the stator 800 is formed in a stator shape forming step (step S10). Thereafter, in a bending press forming step (bending step), the salient pole portions of the flat sheet-like stator 800 are bent so that a plurality of salient pole portions are raised from the surface of the flat sheet (step S12). Then, in a winding member mounting step, using each salient pole portion of the salient pole portions 810*a* to 810*q* raised in step S12 as a winding magnetic core, the winding members are mounted on an outer side of each salient pole portion (step S14).

That is, in the stator shape forming step in step S10, to perform the bending press forming in step S12, as shown in FIG. 18, the salient pole portions 810*a* to 810*q* and the mounting holes 830 are formed on an outer-diameter-side brim portion of an annular flat sheet made of a magnetic material such as SPCC which is common steel or S45C which is carbon steel for machine structural use by press forming thus forming a shape of the stator 800. Here, as explained in conjunction with FIG. 5, the stator 800 is formed such that the distal end of each salient pole portion of the salient pole portions 810*a* to 810*q* has a T shape.

Then, in step S12, as shown in FIG. 19, the plurality of salient pole portions which are formed in step S10 are raised by bending press forming. As a result, the salient pole portions 810*a* to 810*q* are raised such that the salient pole portions 810*a* to 810*q* become approximately perpendicular to the surface of the flat sheet of the stator 800. Accordingly, it is possible to form the stator 800 such that the maximum outer diameter of the stator 800 after bending becomes the outer diameter of each salient pole portion.

The winding member for excitation and the winding member for detection are mounted on the respective salient pole portions raised in this manner such that the winding member for excitation and the winding member for detection are wound around the support portion which supports the distal end portion in each salient pole portion.

Next, in a separate step, the rotor 900 is formed by press forming as shown in FIG. 20. Although the rotor 900 is an annular flat sheet in the embodiment 2, the rotor 900 has a shape where an outer profile line on an outer diameter side changes in two cycles as viewed in a plan view. Then, in a rotor mounting step, the rotor 900 having the shape shown in FIG. 20 is arranged on an outer diameter side of the stator 800 such that the rotor 900 is rotatable relative to the stator 800 (step S16). To be more specific, in the rotor mounting step, the rotor 900 is provided rotatably relative to the stator 800 such that gap permeance between an inner side of the rotor 900 and each salient pole portion of the stator 800 changes due to the rotation of the rotor 900 around the rotary shaft. The resolver 700 according to the embodiment 2 shown in FIG. 16 is manufactured in the above-mentioned manner.

As explained heretofore, according to the embodiment 2, it is possible to manufacture the resolver 700 having small number of parts by a simple method at a low cost without lowering detection accuracy. Further, the number of salient pole portions can be largely increased in the resolver 700 of the embodiment 2 even when the resolver 700 has the same size as the resolver of the embodiment 1 and hence, it is possible to further enhance detection accuracy.

Also in the embodiment 2, in the same manner as the embodiment 1, it is possible to output digital data corresponding to a rotational angle based on a 2-phase detection signal from the resolver 700. The angle detection system to which the resolver 700 according to the embodiment 2 is adopted is equal to the angle detection system shown in FIG. 11 and hence, the illustration and the explanation are omitted.

First Modification of Embodiment 2

The resolver 700 according to the embodiment 2 is exemplified using the example where the salient pole portions formed on the stator 800 constitute the winding magnetic core and the coil windings are mounted on the salient pole portions as the winding members. However, the present invention is not limited to such a constitution. The winding members mounted on the salient pole portions of the stator may be realized by a multi-layered substrate in which a coil portion is formed on each layer, for example.

FIG. 21 is a perspective view of a constitutional example of a resolver according to a first modification of the embodiment 2. The illustration of wiring is omitted in FIG. 21. In FIG. 21, parts identical with the parts shown in FIG. 16 are given the same symbols, and their explanation is omitted when appropriate.

The resolver 1000 according to the first modification of the embodiment 2 is a so-called outer-rotor-type angle detection device. The resolver 1000 according to the first modification of the embodiment 2 differs from the resolver 700 according to the embodiment 2 with respect to the point that winding members which are wound around an outer side of a support portion of each salient pole portion out of salient pole portions 810a to 810q of the stator 800 are not formed of a coil winding but of a multi-layered substrate 1010.

Here, the multi-layered substrate 1010 is formed by stacking insulation substrates on each of which a vortex conductive layer which functions as an exciting coil portion and a detecting coil portion of each salient pole portion of the salient pole portions 810a to 810q of the stator 800 are mounted on respective layers. The coil portions of the respective layers are electrically connected with each other via through holes formed in the insulation substrates on the respective layers. Openings through which the salient pole portions 810a to 810q formed on the stator 800 pass are formed in the multi-layered substrate 1010. For example, the openings are formed in a flexible annular multi-layered substrate in which a slit is formed in one or a plurality of portions of the multi-layered substrate in the circumferential direction or a flexible strip-shaped multi-layered substrate whose both ends are configured to be connected to each other after mounting of the multi-layered substrate on the stator 800, and the respective salient pole portions are allowed to pass through the openings. Accordingly, as shown in FIG. 21, the multi-layered substrate is mounted on the stator 800 in a state that the multi-layered substrate faces an outer peripheral side surface of the stator 800 in an opposed manner, and an exciting coil portion and a detecting coil portion are wound around proximal portions of the respective salient pole portions on an outer side of the respective salient pole portions.

According to the first modification of the embodiment 2, in addition to the advantageous effect obtained by the embodiment 2, the winding member for excitation and the winding member for detection can be formed with high accuracy in accordance with standards so that the deviation of conductance of the winding member for excitation and the winding member for detection can be minimized thus enhancing detection accuracy. Further, the number of turns of winding member for excitation and the number of turns of the winding member for detection can be adjusted corresponding to the number of substrates to be stacked and hence, a winding ratio can be easily adjusted.

The angle detection system 600 shown in FIG. 11 can adopt the resolver 1000 of the first modification of the embodiment 2 in place of the resolver 100.

Second Modification of Embodiment 2

The resolver 700 according to the embodiment 2 has been explained by assuming that the distal end of the salient pole portion formed on the stator 800 has a T shape. However, the present invention is not limited to such structure. The salient pole portion of the stator may have a so-called I shape.

FIG. 22 is a perspective view of a constitutional example of a stator according to a second modification of the embodiment 2. In FIG. 22, parts identical with the parts shown in FIG. 19 are given the same symbols, and their explanation is omitted when appropriate.

The stator 1200 according to the second modification of the embodiment 2 includes, on an annular flat sheet made of a magnetic material, fourteen salient pole portions 840a, 840b, 840c, 840d, 840e, 840f, 840g, 840h, 840j, 840k, 840m, 840n, 840p, 840q which are formed by raising from a surface of the flat sheet. These salient pole portions are formed on a brim portion on an outer side of an annular flat sheet. Out of surfaces of each salient pole portion, at least a surface which faces the rotor 900 is not a flat surface, and is formed so as to constitute a portion of a circle which uses a point positioned on an inner side of the annular flat sheet as the center thereof as viewed along the direction of the rotary shaft of the rotor 900. Further, a winding member for excitation and a winding member for detection are mounted on each salient pole portion as a winding magnetic core. Each salient pole portion has a so-called I shape so that a width of a distal end portion of the salient pole portion and a width of a support portion of the salient pole portion are approximately equal.

Also in FIG. 22, a projection is not formed between the salient pole portions on an outer diameter side of the stator 1200, and a maximum outer diameter of the stator 1200 after bending becomes an outer diameter of the stator 1200 at each salient pole portion.

Figure 23:
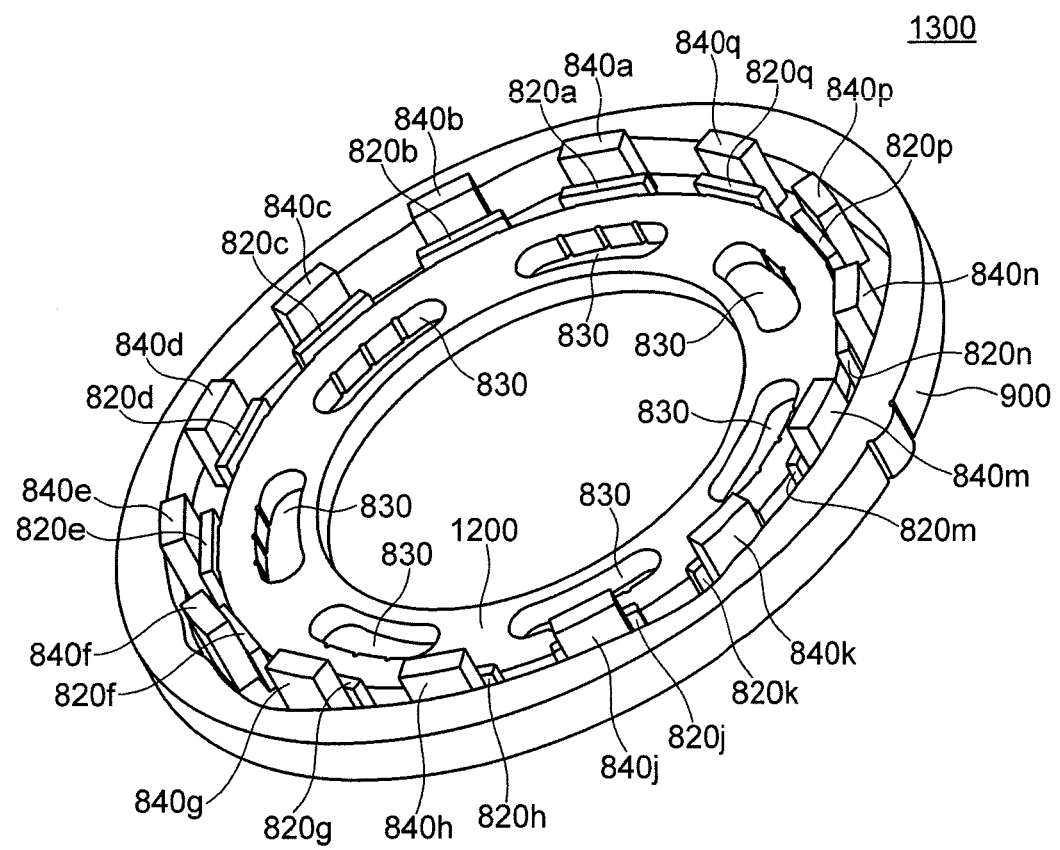
FIG. 23 is a perspective view of a constitutional example of a resolver according to the second modification of the embodiment 2.
Figure 24A:
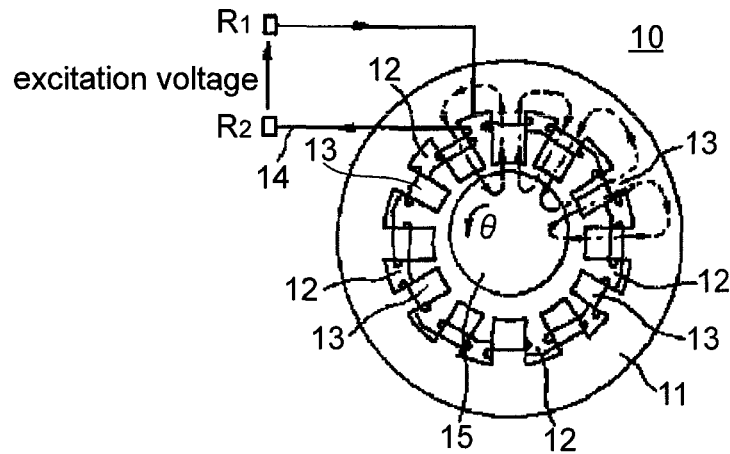
FIG. 24(a) is a view showing the structure of a conventional resolver.
Figure 24B:
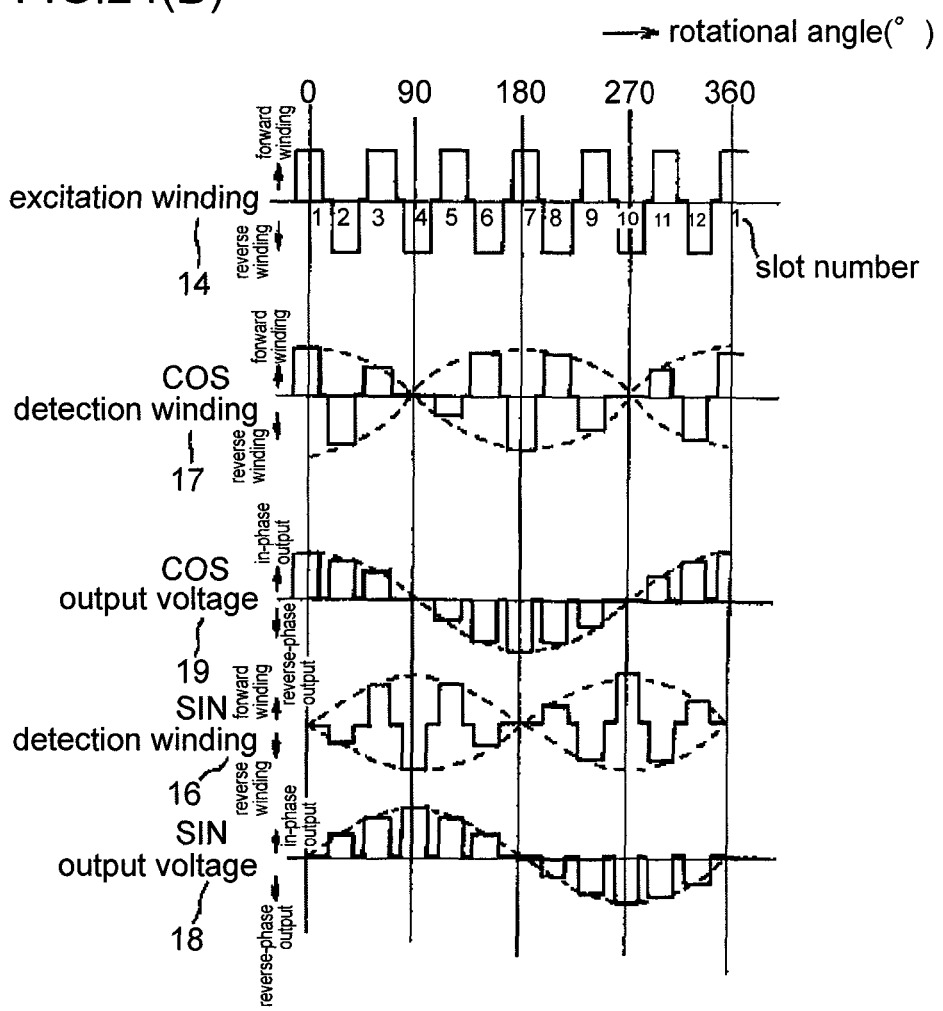
FIG. 24(b) is an explanatory view of the winding structure in each slot of the conventional resolver.

FIG. 23 is a perspective view of a constitutional example of a resolver according to the second modification of the embodiment 2. The illustration of wiring is omitted in FIG. 23. In FIG. 23, parts identical with the parts shown in FIG. 16 or FIG. 22 are given the same symbols, and their explanation is omitted when appropriate.

The resolver 1300 according to the second modification of the embodiment 2 is a so-called outer-rotor-type angle detection device. The resolver 1300 according to the second modification of the embodiment 2 differs from the resolver 700 according to the embodiment 2 with respect to the point that a distal end of the salient pole portion of the stator has an I shape.

According to such second modification of the embodiment 2, the manufacturing steps can be simplified compared to the manufacture of the stator of the embodiment 2 and, in the same manner as the embodiment 2, it is possible to realize the reduction of cost and the enhancement of reliability while reducing the number of parts. Further, according to the second modification, a magnetic flux which passes through the winding magnetic core can be increased and hence, it is possible to further enhance detection accuracy when the number of salient pole portions is small.

Further, the second modification of the embodiment 1 shown in FIG. 23 also can, by adopting the multi-layered substrate as the winding member in the same manner as FIG. 21, acquire the substantially equal advantageous effects as the first modification of the embodiment 2.

The angle detection system 600 shown in FIG. 11 can adopt the resolver 1300 of the second modification of the embodiment 2 in place of the resolver 100.

Although the angle detection device according to the present invention has been explained in conjunction with the embodiments heretofore, the present invention is not limited to the embodiments, and can be carried out without departing from the gist of the present invention. The following modifications are conceivable, for example.

(1) In the above-mentioned respective embodiments and the modifications of the embodiments, although the explanation is made by assuming that the resolver as the angle detection device is formed of a 1-phase excitation and 2-phase output type resolver, the present invention is not limited to the 1-phase excitation and 2-phase output type resolver. In the resolver according to the respective embodiments, an excitation signal may be a signal having a phase other than a 1-phase, and a detection signal may be a signal having a phase other than a two-phase.

(2) In the above-mentioned respective embodiments and the modifications of the embodiments, although the explanation is made by assuming that a material of the stator made of a magnetic material is common steel or carbon steel for machine structural use, the present invention is not limited to such steel. The stator according to the present invention may be made of any material having reliability of bending press forming.

DESCRIPTION OF REFERENCE NUMERALS AND SIGNS 100, 400, 480, 700, 1000, 1300: resolver
200, 450, 800, 1200: stator
210a, 210b, 210c, 210d, 210e, 210f, 210g, 210h, 210j, 210k, 240a, 240b, 240c, 240d, 240e, 240f, 240g, 240h, 240j, 240k, 810a, 810b, 810c, 810d, 810e, 810f, 810g, 810h, 810j, 810k, 810m, 810n, 810p, 810q, 840a, 840b, 840c, 840d, 840e, 840f, 840g, 840h, 840j, 840k, 840m, 840n, 840p, 840q: salient pole portion
220a, 220b, 220c, 220d, 220e, 220f, 220g, 220h, 220j, 220k, 820a, 820b, 820c, 820d, 820e, 820f, 820g, 820h, 820j, 820k, 820m, 820n, 820p, 820q: winding member
230, 830: mounting hole
300, 900: rotor
410, 1010: multi-layered substrate
500: R/D converter
502: loop filter
504: bipolar VCO
506: up/down counter
508: ROM
510: output processing circuit
512: signal generating circuit
600: angle detection system
ADD1: adder
DAC1, DAC2: digital analogue converter
DIF1, DIF2: differential amplifier
MUL1, MUL2, MUL3: multiplier

The invention claimed is:

1. An angle detection system comprising:
a stator including a plurality of salient pole portions formed on a flat sheet made of a magnetic material and raised by bending, each salient pole portion constitutes a winding magnetic core on which a winding member for excitation and a winding member for detection are mounted; and
a rotor made of a magnetic material and is rotatable relative to the stator such that a gap permeance between the rotor and each salient portion is configured to be changed due to the rotation thereof about a rotation axis thereof,
wherein the angle detection system is an inner-rotor-type angle detection system in which the gap permeance between an outer side of the rotor and said each salient pole portion is configured to be changed due to the rotation of the rotor,
wherein a smallest inner diameter of the flat sheet after bending is an inner diameter of the flat sheet at the respective salient pole portions, such that undesired projections are not formed on an inner side of the flat sheet.

2. The angle detection system according to claim 1, wherein a distal end shape of said each salient pole portion forms a T shape, and the winding member for excitation and the winding member for detection are mounted on a periphery of a support portion which supports the distal end portion of said each salient pole portion.

3. The angle detection system according to claim 1, wherein a material of the flat sheet is either SPCC which is common steel or S45C which is carbon steel for machine structural use.

4. The angle detection system according to claim 1, wherein the angle detection system comprises a converter configured to output a digitized signal corresponding to an output signal from the winding member corresponding to a rotational angle of the rotor relative to the stator.

5. The angle detection system according to claim 1, wherein the flat sheet is formed from a annular flat sheet, wherein at least a surface, which faces the rotor in an opposed manner, of each salient portion is formed so as to constitute a portion of a circle, not a flat surface, which has the center inside the annular flat sheet as a center thereof as viewed in the direction along the rotation axis of the rotor.

6. The angle detection system according to claim 1, wherein the stator has a plurality of mounting holes elongated in the circumferential direction than in the radial direction.

7. The angle detection system according to claim 1, wherein the flat sheet is made of one steel plate of the magnetic material.

8. A method of manufacturing an angle detection system comprising:
a bending step in which a plurality of salient pole portions of a stator formed on a flat sheet made of a magnetic material are bent such that the salient pole portions are raised from a surface of the flat sheet;
a winding portion mounting step in which, using each salient pole portion of the plurality of salient pole portions as a winding magnetic core, the winding member for excitation and the winding member for detection are wound around said each salient pole portion; and
a rotor mounting step in which a rotor made of a magnetic material and rotatable relative to the stator such that a gap permeance between the rotor and each salient pole portion is changed due to the rotation thereof about a rotation axis thereof is mounted adjacent the stator, wherein in the rotor mounting step, the rotor is mounted such that the gap permeance between an outer side of the rotor and said each salient pole portion is changed due to the rotation of the rotor, wherein in the bending step, the bending is performed such that a smallest inner diameter of the flat sheet after bending is an inner diameter of the flat sheet at the respective salient pole portions, such that undesired projections are not formed on an inner side of the flat sheet.

9. The method of manufacturing an angle detection system according to claim 8, wherein a distal end shape of said each salient pole portion has a T shape, and the winding member for excitation and the winding member for detection are mounted on a periphery of a support portion which supports a distal end portion of said each salient pole portion.

10. The method of manufacturing an angle detection system according to claim 8, wherein a material of the flat sheet is either SPCC which is common steel or S45C which is carbon steel for machine structural use.

11. An angle detection system comprising:
a stator including a plurality of salient pole portions formed on a flat sheet made of a magnetic material and raised by bending, each salient pole portion constitute a winding magnetic core on which a winding member for excitation and a winding member for detection are mounted; and
a rotor made of a magnetic material and is rotatable relative to the stator such that a gap permeance between the rotor and each salient portion is configure to be changed due to the rotation thereof about a rotation axis thereof,
wherein the angle detection system is an outer-rotor-type angle detection system in which the gap permeance between an inner side of the rotor and said each salient pole portion is configured to be changed due to the rotation of the rotor,
wherein a largest outer diameter of the flat sheet after bending is an outer diameter of the flat sheet at the respective salient pole portions, such that undesired projections are not formed on an outer diameter side of the flat sheet.

12. The angle detection system according to claim 11, wherein a distal end shape of said each salient pole portion forms a T shape, and the winding member for excitation and the winding member for detection are mounted on a periphery of a support portion which supports a distal end portion of said each salient pole portion.

13. The angle detection system according to claim 11, wherein a material of the flat sheet is either SPCC which is common steel or S45C which is carbon steel for machine structural use.

14. The angle detection system according to claim 11, wherein the angle detection system comprises a converter configured to output a digitized signal corresponding to an output signal from the winding member corresponding to a rotational angle of the rotor relative to the stator.

15. The angle detection system according to claim 11, wherein the flat sheet is formed from a annular flat sheet, wherein at least a surface, which faces the rotor in an opposed manner, of each salient portion is formed so as to constitute a portion of a circle, not a flat surface, which has the center inside the annular flat sheet as a center thereof as viewed in the direction along the rotation axis of the rotor.

16. The angle detection system according to claim 11, wherein the stator has a plurality of mounting holes elongated in the circumferential direction than in the radial direction.

17. The angle detection system according to claim 11, wherein the flat sheet is made of one steel plate of the magnetic material.

18. A method of manufacturing an angle detection system comprising:
a bending step in which a plurality of salient pole portions of a stator portion formed on a flat sheet made of a magnetic material are bent such that the salient pole portions are raised from a surface of the flat sheet;
a winding portion mounting step in which, using each salient pole portion of the plurality of salient pole portions as a winding magnetic core, the winding member for excitation and the winding member for detection are wound around said each salient pole portion; and
a rotor mounting step in which a rotor which is made of a magnetic material and rotatable relative to the stator such that a gap permeance between the rotor and each salient pole portion is changed due to the rotation thereof about a rotation axis thereof is mounted adjacent the stator,
wherein in the rotor mounting step, the rotor is mounted such that the gap permeance between an inner side of the rotor and said each salient pole portion is changed due to the rotation of the rotor,
wherein in the bending step, the bending is performed such that a largest outer diameter of the flat sheet after bending is an outer diameter of the flat sheet at the respective salient pole portions, such that undesired projections are not formed on an outer diameter side of the flat sheet.

19. The method of manufacturing an angle detection system according to claim 18, wherein a distal end shape of said each salient pole portion forms a T shape, and the winding member for excitation and the winding member for detection are mounted on a periphery of a support portion which supports a distal end portion of said each salient pole portion.

20. The method of manufacturing an angle detection system according to claim 18, wherein a material of the flat sheet is either SPCC which is common steel or S45C which is carbon steel for machine structural use.

* * * * *